United States Patent
Nuzum et al.

(10) Patent No.: US 11,620,623 B2
(45) Date of Patent: Apr. 4, 2023

(54) MERCHANT TRANSACTION MIRRORING FOR PERSONAL POINT OF SALE (PPOS) FOR CARD PRESENT E-COMMERCE AND IN VEHICLE TRANSACTION

(71) Applicant: NXP B.V., Eindhoven (NL)

(72) Inventors: Todd Raymond Nuzum, Omaha, NE (US); Michael Dow, Austin, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/995,033

(22) Filed: May 31, 2018

(65) Prior Publication Data
US 2019/0370769 A1    Dec. 5, 2019

(51) Int. Cl.
*G06Q 20/20*    (2012.01)
*G06Q 30/00*    (2012.01)
(Continued)

(52) U.S. Cl.
CPC ......... *G06Q 20/20* (2013.01); *G06F 21/6254* (2013.01); *G06Q 20/351* (2013.01); *G06Q 20/4018* (2013.01); *G06Q 30/01* (2013.01)

(58) Field of Classification Search
CPC .............. G06Q 20/3229; G06Q 20/20; G06Q 30/0238; G06Q 30/0268; G06Q 20/22; G06Q 20/3278; G06Q 20/385; G06Q 20/36; G06Q 20/3674; G06Q 20/3821; G06Q 30/0641; G06Q 20/4018; G06Q 30/0215; G06Q 20/351; G06Q 30/01; G06Q 20/206; G06Q 20/341; G06Q 20/382; G06Q 20/3829; G06Q 20/388; G06Q 40/04;
(Continued)

(56) References Cited

U.S. PATENT DOCUMENTS 5,721,781 A    2/1998    Deo et al.
5,910,987 A    6/1999    Ginter et al.
(Continued)

FOREIGN PATENT DOCUMENTS

CN    101976377 A    2/2011
CN    202003442 U    10/2011
(Continued)

OTHER PUBLICATIONS

Non-Final Office Action for U.S. Appl. No. 15/462,904; dated Dec. 12, 2019; 12 Pages.
(Continued)

*Primary Examiner* — Peter Ludwig
*Assistant Examiner* — Avia Salman

(57) ABSTRACT

It is desirable for a merchant to not store customer PCI (Payment Card Industry) data in the merchant's system, because this would reduce cost and risk to the merchant. But the merchant still wants access to the customer primary account number (PAN) and other PCI data elements for customer authentication, customer relationship management, etc. Therefore, this specification discloses systems and methods that allow a pPOS (personal Point of Sale) device to create a mirror of the original transaction and provide that to the merchant. Then the merchant would still have access to the customer PAN and other PCI data elements, but there are no PCI or payment data in the mirror transaction, so cost and risk are reduced for the merchant.

14 Claims, 12 Drawing Sheets

(51) Int. Cl.
*G06F 21/62* (2013.01)
*G06Q 20/34* (2012.01)
*G06Q 20/40* (2012.01)
*G06Q 30/01* (2023.01)

(58) Field of Classification Search
CPC ......... G06F 21/6254; G06F 2221/2113; G07B 2017/00225; G07F 7/088; G07F 7/0886; G07G 1/0009; G06K 19/06028; G09G 2370/16; G09G 2354/00; G09G 2380/04; G09G 5/12
See application file for complete search history.

(56) References Cited

U.S. PATENT DOCUMENTS

| | | |
|---|---|---|
| 6,112,987 A | 9/2000 | Lambert et al. |
| 6,587,838 B1 | 7/2003 | Esposito et al. |
| 6,615,194 B1 | 9/2003 | Deutsch et al. |
| 6,889,198 B2 | 5/2005 | Kawan |
| 6,978,933 B2 | 12/2005 | Yap et al. |
| 6,983,882 B2 | 1/2006 | Cassone |
| 7,500,616 B2 | 3/2009 | Beenau et al. |
| 8,229,358 B2 | 7/2012 | Caudevilla Laliena et al. |
| 8,240,561 B2 | 8/2012 | Busch-Sorensen |
| 8,706,032 B2 | 4/2014 | Zhang et al. |
| 8,807,440 B1 | 8/2014 | von Behren et al. |
| 8,965,398 B2 | 2/2015 | Zhu et al. |
| 8,985,442 B1 | 3/2015 | Zhou et al. |
| 9,026,459 B2 | 5/2015 | Fisher |
| 9,027,102 B2 | 5/2015 | Katzer et al. |
| 9,092,766 B1 | 7/2015 | Bedier et al. |
| 9,294,268 B2 * | 3/2016 | von Mueller ......... H04L 9/0625 |
| 9,312,923 B2 | 4/2016 | Lyne et al. |
| 9,317,845 B1 | 4/2016 | Ekseliu et al. |
| 9,332,432 B2 | 5/2016 | Low et al. |
| 9,704,355 B2 | 7/2017 | Beatty et al. |
| 9,852,410 B1 | 12/2017 | Chen et al. |
| 9,906,454 B2 | 2/2018 | Prakash et al. |
| 2002/0163421 A1 | 11/2002 | Wang et al. |
| 2004/0078589 A1 | 4/2004 | Giraud |
| 2004/0236693 A1 | 11/2004 | Quesselaire |
| 2006/0069926 A1 | 3/2006 | Ginter et al. |
| 2008/0086417 A1 | 4/2008 | Bykov et al. |
| 2009/0164327 A1 | 6/2009 | Bishop et al. |
| 2009/0187492 A1 | 7/2009 | Hammad et al. |
| 2009/0307142 A1 | 12/2009 | Mardikar |
| 2010/0011270 A1 | 1/2010 | Yamamoto et al. |
| 2010/0280956 A1 | 11/2010 | Chutorash et al. |
| 2012/0022914 A1 | 1/2012 | Edward et al. |
| 2012/0072350 A1 | 3/2012 | Goldthwaite et al. |
| 2012/0084210 A1 | 4/2012 | Farahmand |
| 2012/0109829 A1 | 5/2012 | McNeal et al. |
| 2012/0246079 A1 | 9/2012 | Wilson et al. |
| 2013/0086375 A1 | 4/2013 | Lyne et al. |
| 2013/0179351 A1 | 7/2013 | Wallner |
| 2013/0282502 A1 | 10/2013 | Jooste |
| 2013/0344807 A1 | 12/2013 | Huomo et al. |
| 2014/0040149 A1 | 2/2014 | Fiske |
| 2014/0058937 A1 * | 2/2014 | Watson ............ G06Q 20/3227 705/41 |
| 2014/0095385 A1 | 4/2014 | Ainslie et al. |
| 2014/0114853 A1 * | 4/2014 | Guedj ................. G06Q 20/12 705/44 |
| 2014/0136354 A1 | 5/2014 | Emery et al. |
| 2014/0195429 A1 | 7/2014 | Paulsen |
| 2014/0279565 A1 | 9/2014 | Trump et al. |
| 2014/0310113 A1 | 10/2014 | Sengupta |
| 2014/0324698 A1 | 10/2014 | Dolcino et al. |
| 2015/0046216 A1 * | 2/2015 | Adjaoute ........... G06Q 20/4016 705/7.29 |
| 2015/0058224 A1 | 2/2015 | Gaddam et al. |
| 2015/0081461 A1 | 3/2015 | Adrangi et al. |
| 2015/0287031 A1 | 10/2015 | Radu et al. |
| 2015/0339659 A1 | 11/2015 | Ballesteros |
| 2015/0348001 A1 | 12/2015 | Van Os et al. |
| 2016/0057619 A1 | 2/2016 | Lopez |
| 2016/0063480 A1 | 3/2016 | Ballesteros |
| 2016/0092876 A1 | 3/2016 | Kamal et al. |
| 2016/0125376 A1 | 5/2016 | Beatty et al. |
| 2016/0364717 A1 | 12/2016 | Lyne |
| 2016/0364723 A1 | 12/2016 | Reese et al. |
| 2017/0061441 A1 | 3/2017 | Kamal et al. |
| 2017/0076269 A1 | 3/2017 | Saeed et al. |
| 2017/0103382 A1 | 4/2017 | Kim et al. |
| 2017/0109399 A1 * | 4/2017 | Stearn .................... G06N 5/04 |
| 2017/0109509 A1 * | 4/2017 | Baghdasaryan ...... G06F 21/316 |
| 2017/0109620 A1 | 4/2017 | Wurmfeld et al. |
| 2017/0178100 A1 | 6/2017 | Bergeon et al. |
| 2017/0200144 A1 | 7/2017 | Chatterton |
| 2017/0221056 A1 | 8/2017 | Karpenko et al. |
| 2017/0278096 A1 * | 9/2017 | Chitalia ........... G06Q 20/40145 |
| 2017/0317987 A1 | 11/2017 | Vijayasankar et al. |
| 2017/0357970 A1 | 12/2017 | Muftic |
| 2017/0357973 A1 | 12/2017 | Van Os et al. |
| 2018/0033013 A1 | 2/2018 | Park et al. |
| 2018/0089691 A1 | 3/2018 | Sibert et al. |
| 2018/0101837 A1 | 4/2018 | Pandey et al. |
| 2018/0130040 A1 | 5/2018 | Nuzum et al. |
| 2018/0144334 A1 | 5/2018 | Fontaine et al. |
| 2018/0165759 A1 | 6/2018 | Carrington et al. |
| 2018/0189769 A1 | 7/2018 | Narasimhan et al. |
| 2018/0268390 A1 | 9/2018 | Nuzum et al. |
| 2018/0268408 A1 | 9/2018 | Bortos et al. |
| 2018/0365679 A1 | 12/2018 | Nuzum et al. |
| 2019/0114606 A1 | 4/2019 | Nuzum et al. |

FOREIGN PATENT DOCUMENTS

| | | |
|---|---|---|
| GB | 2524946 A | 10/2015 |
| GB | 2529872 A | 3/2016 |
| WO | 00/26838 A1 | 5/2000 |
| WO | 2008/103880 A2 | 8/2008 |
| WO | 2010/033967 A1 | 3/2010 |
| WO | 2010/128442 A2 | 11/2010 |
| WO | 2013/126996 A1 | 9/2013 |
| WO | 2015/080689 A1 | 6/2015 |
| WO | 2016/122457 A1 | 8/2016 |
| WO | 2016/175388 A2 | 11/2016 |

OTHER PUBLICATIONS

Non-Final Office Action for U.S. Appl. No. 15/783,876; dated Jan. 21, 2020; 57 pages.
Final Office Action for U.S. Appl. No. 15/344,508; dated Dec. 20, 2019; 7 Pages.
Non-Final Office Action for U.S. Appl. No. 15/462,904 dated May 31, 2019; 25 Pages.
Non-Final Office Action for U.S. Appl. No. 15/344,508 dated Aug. 14, 2019; 17 Pages.
Final Office Action for U.S. Appl. No. 15/344,508 (dated Mar. 25, 2019).
"Secure cryptoprocessor". As last edited by "jpbowen". Retrieved from: https://en.wikipedia.org/w/index.php?title=Secure cryptoprocessor&oldid=721306220 Revision date: May 20, 2016.
U.S. Appl. No. 15/783,876, filed Oct. 13, 2017.
Office Action for related U.S. Appl. No. 15/344,508 (dated May 31, 2018).
Final Office Action for U.S. Appl. No. 15/627,406; dated Jul. 2, 2020; 34 Pages.
Final Office Action for U.S. Appl. No. 15/783,876; dated Jul. 17, 2020; 57 pages.
Non-Final Office Action dated Jun. 26, 2020 for U.S. Appl. No. 15/462,904, 20 Pages.
Notice of Allowance for U.S. Appl. No. 15/344,508; dated Apr. 3, 2020; 12 Pages.
Non-Final Office Action for U.S. Appl. No. 15/462,904 dated Dec. 31, 2020; 26 Pages.
Non-Final Office Action for U.S. Appl. No. 15/783,876; dated Mar. 11, 2021; 43 pages.

(56) References Cited

OTHER PUBLICATIONS

Non-Final Office Action for U.S. Appl. No. 15/627,406; dated Nov. 13, 2020; 24 pages.
Final Office Action for U.S. Appl. No. 15/462,904 dated Jun. 24, 2021; 21 Pages.
Final Office Action for U.S. Appl. No. 15/783,876 dated Sep. 14, 2021; 41 Pages.
Notice of Allowance; U.S. Appl. No. 15/462,904; 15 pages (dated Sep. 28, 2022).
Final Office Action; U.S. Appl. No. 15/462,904; 12 pages (dated Mar. 25, 2022).
Non-Final Office Action for U.S. Appl. No. 15/783,876; dated Jul. 1, 2022; 29 pages.
Non-Final Office Action for U.S. Appl. No. 15/627,406; (dated Feb. 24, 2020) 17 pages.
Final Office Action; U.S. Appl. No. 16/627,406; (dated Mar. 18, 2021) 22 pages.

\* cited by examiner

MERCHANT TRANSACTION MIRRORING FOR PERSONAL POINT OF SALE (PPOS) FOR CARD PRESENT E-COMMERCE AND IN VEHICLE TRANSACTION

CROSS REFERENCE TO RELATED APPLICATIONS

This application is related to U.S. patent application Ser. No. 15/344,508, entitled "PERSONAL POINT OF SALE (PPOS) DEVICE THAT PROVIDES FOR CARD PRESENT E-COMMERCE TRANSACTION" filed on Nov. 4, 2016, U.S. patent application Ser. No. 15/462,904, entitled "PERSONAL POINT OF SALE (PPOS) DEVICE WITH A LOCAL AND/OR REMOTE PAYMENT KERNEL THAT PROVIDES FOR CARD PRESENT E-COMMERCE TRANSACTION" filed on Mar. 19, 2017, U.S. patent application Ser. No. 15/627,406, entitled "MERCHANT AUTHENTICATION TO VEHICLE BASED PERSONAL POINT OF SALE (PPOS) DEVICE THAT PROVIDES FOR CARD PRESENT E-COMMERCE TRANSACTION" filed on Jun. 19, 2017, and U.S. patent application Ser. No. 15/783,876, entitled "PERSONAL POINT OF SALE (PPOS) WITH DYNAMIC PAYMENT KERNEL CONFIGURATION FOR CARD PRESENT E-COMMERCE AND IN VEHICLE TRANSACTION" filed on Oct. 13, 2017, which are all being incorporated herein by reference in their entirety.

FIELD

The described embodiments relate generally to devices and methods that provide for e-commerce transactions and/or in vehicle merchant payments, and more particularly to devices and methods that provide merchant transaction mirroring for personal Point of Sale (pPOS) for card present e-commerce transactions and/or in vehicle merchant payments.

BACKGROUND

Today e-commerce transactions are processed as "card not present". This means the customer has to enter their card account number, printed security features on the card like CVC/CVC2 (card verification code/card validation code). This data is used and stored by the merchant to make the payment. This is customer PCI (Payment Card Industry) data. The merchant also pays a higher interchange rate because of the type of fraud which is possible because the data is exposed in the transaction and at the merchant web site.

Alternatively, "card present" e-commerce transactions can overcome some problems or disadvantages associated with "card not present" e-commerce transactions. However, both "card present" and "card not present" e-commerce transactions can still cause the merchant to store customer PCI (Payment Card Industry) data in the merchant's system, which would incur extra cost and risk to the merchant Therefore, it is desirable to develop systems and methods that would help a merchant to not having to store customer PCI (Payment Card Industry) data in the merchant's system.

SUMMARY

Within the EMV payment specification, the use of an unattended terminal to accept a payment is allowed. Creating a device that has both the EMV level 1 (L1) and level 2 (L2) payment components combined with a virtual merchant creates a "card present" transaction for an on-line or e-commerce merchant. This device can be called a personal Point of Sale (pPOS). (Note: EMV stands for Europay, MasterCard, and Visa.).

It is desirable for a merchant to not store customer PCI (Payment Card Industry) data in the merchant's system, because this would reduce cost and risk to the merchant. But the merchant still wants access to the customer primary account number (PAN) and other PCI data elements for customer authentication, customer relationship management, etc. Therefore, this specification discloses systems and methods that allow a pPOS (personal Point of Sale) device to create a mirror of the original transaction and provide that to the merchant. Then the merchant would still have access to the customer PAN and other PCI data elements, but there are no PCI or payment data in the mirror transaction, so cost and risk are reduced for the merchant.

The present invention discloses a method for providing transaction mirroring of a merchant transaction using a personal point of sale (pPOS), the method comprising: (a) filtering transaction data, wherein filtering is comprised of identifying payment and/or customer identification data elements in a transaction; (b) creating a merchant mirror transaction from the payment and/or customer identification data elements, wherein creating is comprised of using data encoding functions; (c) validating the merchant mirror transaction, wherein validating is comprised of authenticating data elements in the merchant mirror transaction.

In some embodiments, the data encoding functions is comprised of one or more of the following: translating, mapping, masking, and randomizing the payment and/or customer identification data elements.

In some embodiments, the data encoding functions is further comprised of using local and external sensor data to seed a data element initialization array and/or modeling function for each type of data element to be translated, mapped, masked, and randomized, wherein a local sensor switch transmits the local sensor data and an external data sensor switch transmits the external sensor data.

In some embodiments, the data encoding functions is further comprised of encryption, wherein local and external sensor data is used to seed a random salt value for a specific encryption key for specific data element encryptions, wherein a local sensor switch transmits the local sensor data and an external data sensor switch transmits the external sensor data.

In some embodiments, translating is comprised of using different terms for a data element.

In some embodiments, mapping is comprised of establishing a one-to-one relationship between a data element with a value and/or a function.

In some embodiments, masking is comprised of substituting part of a data element.

In some embodiments, identifying the payment data elements is comprised of: (a) using data pattern matching technique to determine the payment data elements, (b) using heuristic rules technique to determine the payment data elements, (c) using artificial intelligence neural net technique to determine the payment data elements.

In some embodiments, the payment data elements are comprised of one or more of the following: credit card number, credit card data, debit account number, debit account data, close loop stored value number, coupon encoded data element, voucher encoded data element, rebate encoded data element, digital currency data elements.

In some embodiments, identifying the customer identification data elements is comprised of: (a) using data pattern matching technique to determine the customer identification data elements, (b) using heuristic rules technique to determine the customer identification data elements, (c) using artificial intelligence neural net technique to determine the customer identification data elements.

In some embodiments, the customer identification data elements are comprised of one or more of the following: name, address, city, state, zip code, email, government or state or local ID (identification) number, driver license data elements, passport data elements.

In some embodiments, the method is further comprising of: (d) formatting and transmitting encrypted transaction data to a merchant acquirer; (e) transmitting the merchant mirror transaction to a merchant.

In some embodiments, the method is further comprising of: (f) synchronizing merchant mirror transaction data elements and the merchant mirror transaction to the original transaction.

The present invention discloses a computer program product comprising executable instructions encoded in a non-transitory computer readable medium which, when executed by a system, carry out or control the following method for providing transaction mirroring of a merchant transaction using a personal point of sale (pPOS), the method comprising: (a) filtering transaction data, wherein filtering is comprised of identifying payment and/or customer identification data elements in a transaction; (b) creating a merchant mirror transaction from the payment and/or customer identification data elements, wherein creating is comprised of using data encoding functions; (c) validating the merchant mirror transaction, wherein validating is comprised of authenticating data elements in the merchant mirror transaction.

The present invention further discloses a device for providing a personal point of sale (pPOS), the device comprising: (a) a reader, the reader configured to read a payment and/or identity instrument, wherein the reader is further configured to filtering transaction data, wherein filtering is comprised of identifying payment and/or customer identification data elements in a transaction; (b) a secure microcontroller function (MCF), wherein the secure MCF is configured to creating a merchant mirror transaction from the payment and/or customer identification data elements, wherein creating is comprised of using data encoding functions, wherein the secure MCF is further configured to validating the merchant mirror transaction, wherein validating is comprised of authenticating data elements in the merchant mirror transaction; (c) a secure element, the secure element configured to store and process payment and identification application.

In some embodiments, the device is further comprising: (d) a second microcontroller function (MCF), wherein the secure MCF and/or the second MCF is configured to formatting and transmitting encrypted transaction data to a merchant acquirer, wherein the secure MCF and/or the second MCF is further configured to transmitting the merchant mirror transaction to a merchant.

In some embodiments, the device is further comprising one or more of the following: (e) a local sensor switch, the local sensor switch configured to initiate and/or terminate a transaction, wherein the local sensor switch transmits local sensor data to the secure element; (f) an external data sensor switch, wherein the external data sensor switch transmits external sensor data to the secure element.

In some embodiments, the secure MCF and/or the second MCF is further configured to synchronizing merchant mirror transaction data elements and the merchant mirror transaction to the original transaction.

The present invention also discloses a device for providing a personal point of sale (pPOS), the device comprising: (a) a reader, the reader configured to read a payment and/or identity instrument, wherein the reader is further configured to filtering transaction data, wherein filtering is comprised of identifying payment and/or customer identification data elements in a transaction, wherein the reader is further configured to creating a merchant mirror transaction from the payment and/or customer identification data elements, wherein creating is comprised of using data encoding functions; (b) a secure microcontroller function (MCF), wherein the secure MCF is configured to validating the merchant mirror transaction, wherein validating is comprised of authenticating data elements in the merchant mirror transaction; (c) a secure element, the secure element configured to store and process payment and identification application.

In some embodiments, the device is further comprising: (d) a second microcontroller function (MCF), wherein the secure MCF and/or the second MCF is configured to formatting and transmitting encrypted transaction data to a merchant acquirer, wherein the secure MCF and/or the second MCF is further configured to transmitting the merchant mirror transaction to a merchant.

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
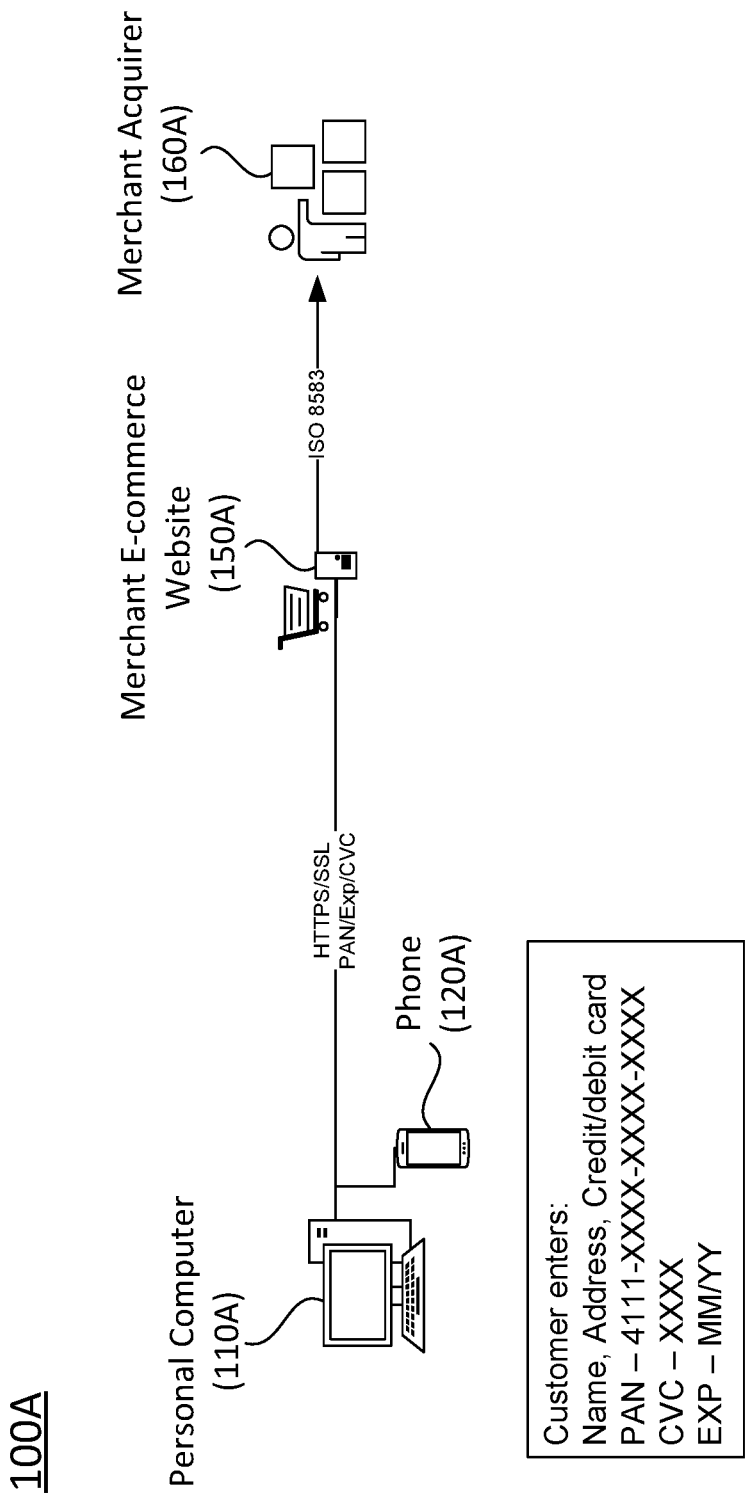
FIG. 1A shows a prior art process flow with typical e-commerce components for "card not present" transactions, where customer data is not stored (e.g., usually for one-time payment approach).

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps or device details have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In order to reduce a merchant's risk and cost of PCI (payment card industry) implementation and audits and also to add additional services to merchant, a merchant acquirer (MA) has to implement point-to-point encryption (P2PE) on a merchant reader. However, this causes the merchant to lose the ability to use the customer primary account number (PAN) and other PCI data elements for customer authentication, customer validation, Customer Relationship Management (CRM), merchant loyalty programs, across payment types (different payment types for promotion) & payment instrument promotions, and value added account (PAN) level services.

To solve above problem, a pPOS (personal Point of Sale) device can create a mirror of the original transaction and provide that to the merchant. This allows the merchant to have the ability to use mirror created data elements like a mirrored account number and other PCI data elements in the mirror transaction data to link back to the original customer and/or device. The creation and validation of the transaction mirror are new data elements unique to the customer using the pPOS device and the merchant processing the mirror. The mirror transaction has no monetary value to the merchant, merchant acquirer, and customer. There are no PCI or payment data in the mirror transaction. Later on, there can be on device message synchronization between the original and mirrored transaction. Here, the only way to determine linkages to the original transactions from the mirrored transaction is on the pPOS device that created the mirror, because the local and external data sensor switches are on the pPOS device that created the new data elements and the transaction mirror.

In addition to the customer PAN, the merchant would also want to be able to use identification data elements (like biometric and/or driver license ID, etc.) to make a payment as well. In order to protect both the merchant and the customer, the above mirror transaction scheme can also be extended to protect these identification data elements by also mirroring these identification data elements to the merchant.

The following approach can be used to create the transaction mirror.

(a) Use the local and external data sensor switches to collect different data elements to be used as indexing (indexing to rules) and random element primers (using sensor switch data as random elements) that are then used to either translate, map, mask, and/or randomize the original data elements into the mirror transaction data elements.

(b) The ability to utilize user preference and merchant preference selections to allow the user and merchant to determine the selection and complexity of the different function used for creating the mirror data and transactions.

(c) Each transaction has four parts: user (i.e., customer) data elements, merchant data elements, merchant acquirer data elements, and device (i.e., pPOS device) data elements. Local sensor switch data is used to encode all data elements. External sensor switch data is added to encode specific transaction data elements.

On device message synchronization is the recreation of linkage/mapping data elements between the original and mirror data elements and/or transactions. This is possible in principle, but since a merchant needs to be connected to the pPOS device for a certain amount of time, it might not always be possible. However, a pPOS device linked to a car or a phone could be connected all the time, making on device message synchronization possible.

How can the mirror transaction be created using local sensor data and external sensor data from a local sensor switch and an external data sensor switch? The key here is the randomization of data created by the sensor switches (both local and external data), time, and the external data. This makes the new data created in the mirror transaction very unique based on sensor data type like a customer biometric data and/or remote data element from external data sources like RF (radio frequency) signal strength and data elements, WiFi (wireless local area network) data elements, GSM (Global System for Mobile Communications) data elements, Bluetooth data elements, images, vehicle related data, etc.

How can the mirror transaction be synchronized and/or linked back to the original transaction? The key here is the on device level features to recreate the original transaction from the transaction mirror. The pPOS device can synchronized and/or linked back the mirror transaction to the original transaction.

To better understand the above concepts, let us look at FIGS. 1-10.

FIG. 1A shows a prior art process flow 100A with typical e-commerce components for "card not present" transactions, where customer data is not stored (e.g., usually for one-time payment approach). As can be seen in FIG. 1A, for such "card not present" transactions, where customer data is not stored (e.g., usually for one-time payment approach), the customer typically needs to enter the following customer data: name, address, payment information, etc. The payment information can include the credit/debit card's PAN (Primary Account Number), CVC (Card Verification Code, or CVV—Card Verification Value), EXP (Credit card expiration date). In FIG. 1A, PAN is shown as 4111-XXXX-XXXX-XXXX, CVC as XXXX, EXP as MM/YY (month/year).

The customer enters the customer data into a personal computer 110A or a smart phone 120A. For a "card not present" transaction, the customer data is transmitted to a merchant e-commerce (electronic commerce) website 150A, via HTTPS/SSL (Hypertext Transfer Protocol Secure/Secure Sockets Layer) for a secure and encrypted communication link between a browser and a web server over the internet. Because this is a one-time payment, the merchant typically does not store any PCI (Payment Card Industry) data. Then the merchant e-commerce website 150A further transmits the payment information to the merchant acquirer 160A using ISO 8583, which is an international standard for financial transaction card originated interchange messaging.

The key point to FIG. 1A is that the merchant server and software need to protect the customer payment data via PCI requirements. With no merchant mirroring of the payment transaction, this is a burdensome and expensive requirement for the merchant, as well exposing the merchant to potentially huge legal and financial liabilities, if the customer data is hacked or stolen.

Figure 1B:
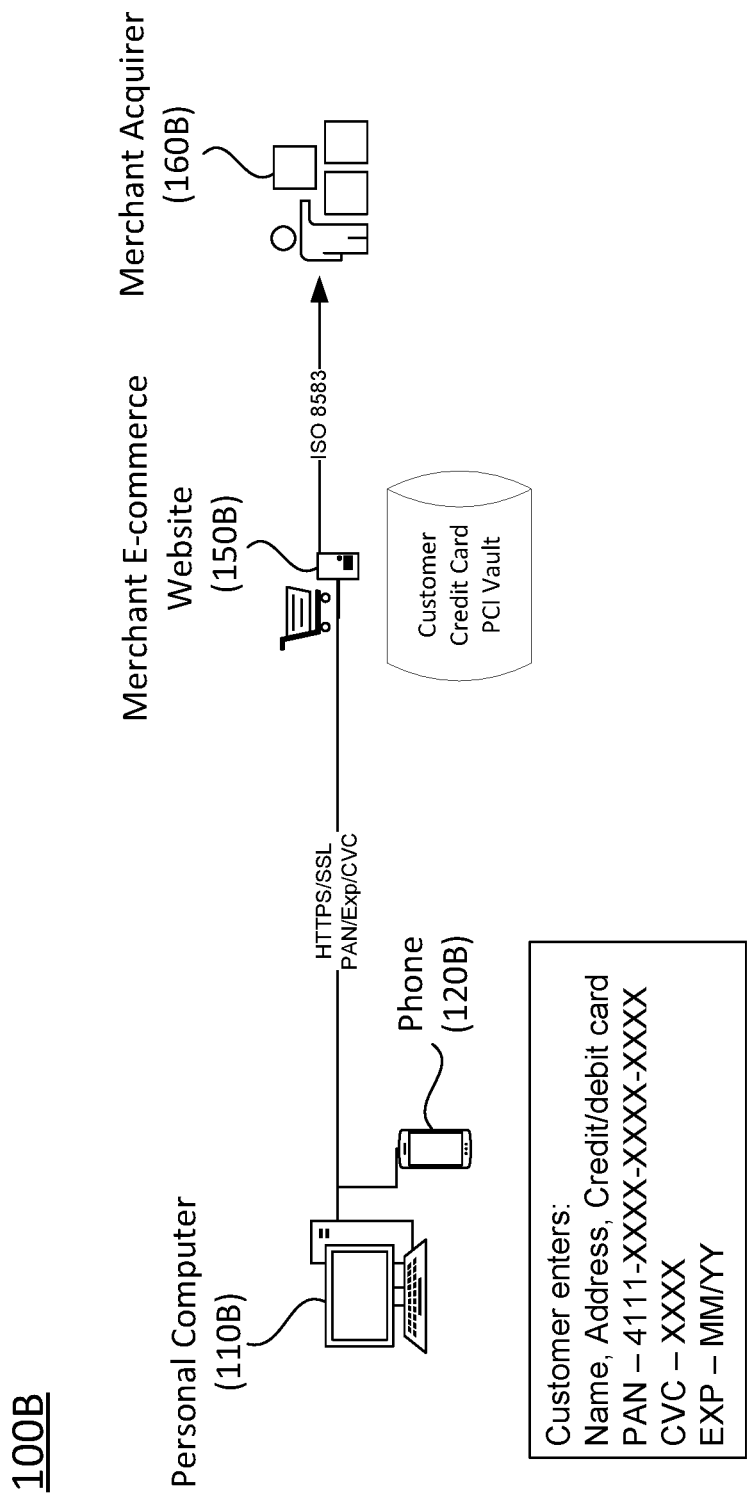
FIG. 1B shows a prior art process flow with typical e-commerce components for "card not present" transactions, where customer data is stored (e.g., usually for recurring payment approach).

FIG. 1B shows a prior art process flow with typical e-commerce components for "card not present" transactions, where customer data is stored (e.g., usually for recurring payment approach). FIG. 1B is very similar to FIG. 1A, except now the customer data is now stored by the merchant, because this is for a recurring payment, although the customer data can also be stored for a one-time payment.

Similar to FIG. 1A, FIG. 1B shows that for such "card not present" transactions, the customer needs to enter the following customer data: name, address, payment information, etc. In turn, the payment information can include the credit/debit card's PAN (Primary Account Number), CVC (Card Verification Code, or CVV—Card Verification Value), EXP (Credit card expiration date). In FIG. 1B, PAN is shown as 4111-XXXX-XXXX-XXXX, CVC as XXXX, EXP as MM/YY (month/year).

The customer enters the customer data into a personal computer 110B or a smart phone 120B. For a "card not present" transaction, the customer data is transmitted to a merchant e-commerce (electronic commerce) website 150B, via HTTPS/SSL (Hypertext Transfer Protocol Secure/Secure Sockets Layer) for a secure and encrypted communication link between a browser and a web server over the internet. In FIG. 1B, the merchant stores the PCI (Payment Card Industry) data in a customer credit card PCI vault (e.g., usually for recurring payment approach). Typically, both the customer data and payment data are stored. Then the merchant e-commerce website 150B further transmits the payment information to the merchant acquirer 160B using ISO 8583, which is an international standard for financial transaction card originated interchange messaging.

Like FIG. 1A, the key point to FIG. 1B is that the merchant server and software need to protect the customer payment data via PCI requirements. Again, with no merchant mirroring of the payment transaction, this is a burdensome and expensive requirement for the merchant, as well exposing the merchant to potential huge legal and financial liabilities, if the customer data is hacked or stolen. It should be noted that the cost and liabilities are increased in the FIG. 1B, because the stored customer credit card PCI data can be hacked or stolen from the merchant website.

Therefore, both FIGS. 1A and 1B highlight the need to perform merchant mirroring of the payment transaction, so that the merchant will only receive a mirror of the payment transaction, and have direct transmission of the customer payment data to the merchant acquirer. This, in turn, will save the merchant from the cost and liability of protecting the customer payment data at the merchant website, as well as the added cost of PCI implementation and audit. This can be especially helpful for mid-size and small-size merchants with limited resources, but should also a big cost savings for the large-size merchants.

Figure 2A:
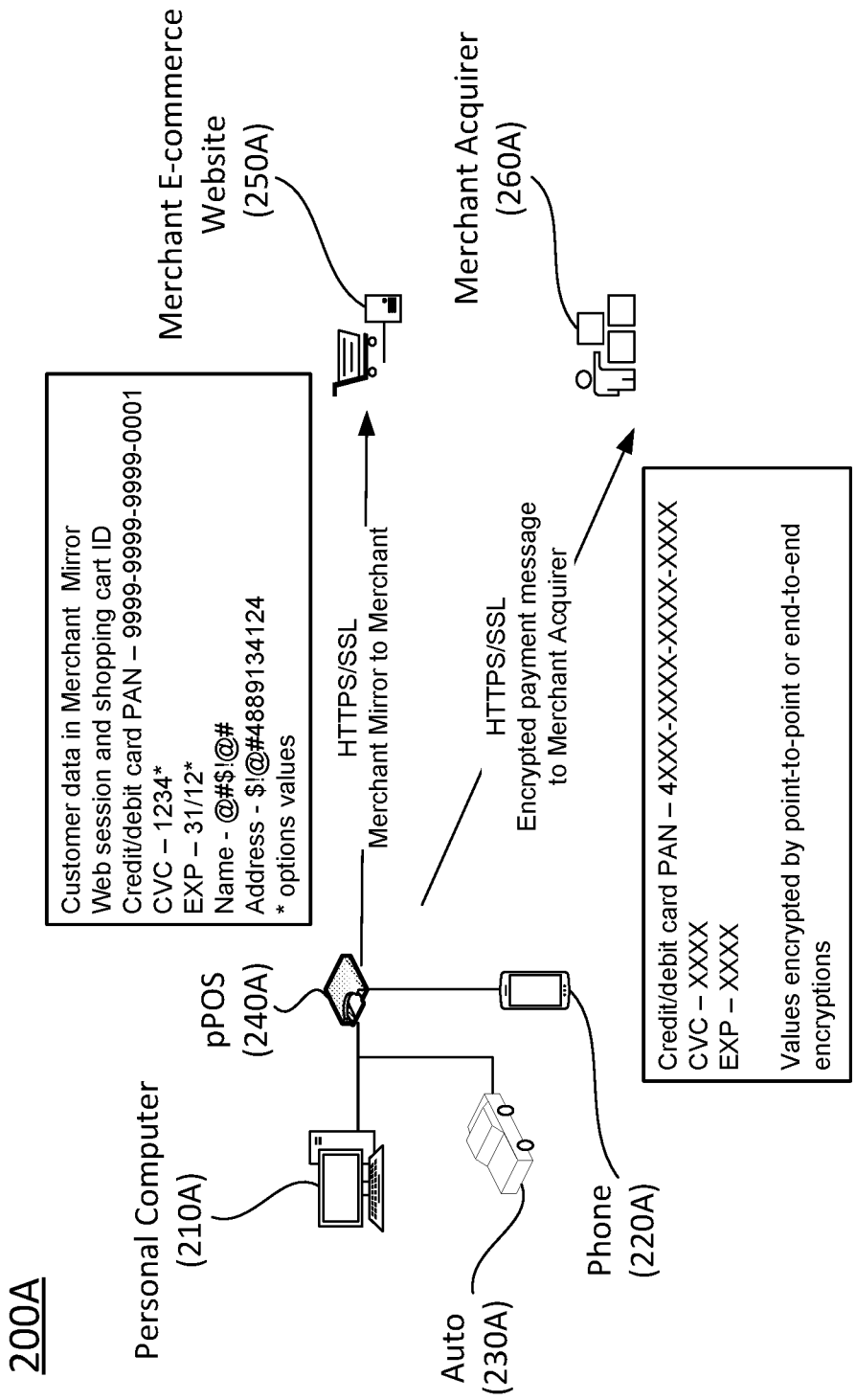
FIG. 2A shows e-commerce components and process flows for "card present" transactions performed with a personal Point of Sale (pPOS) device, together with Merchant Transaction Mirror, in accordance with some example embodiments.

FIG. 2A shows an embodiment of such an implementation of merchant mirroring of the payment transaction. In particular, FIG. 2A shows e-commerce components and process flows for "card present" transactions performed with a personal Point of Sale (pPOS) device, together with Merchant Transaction Mirror, in accordance with some example embodiments. As can be seen in FIG. 2A, for such "card present" transactions, the customer typically still needs to enter the following customer data: name, address, payment information, etc. Here, the payment information can include the credit/debit card's PAN, CVC, EXP. In FIG. 2A, PAN is shown as 4111-XXXX-XXXX-XXXX, CVC as XXXX, EXP as XXXX (month/year).

FIG. 2A shows that the customer can enter the customer data directly into a pPOS 240A, or indirectly into a personal computer 210A, a smart phone 220A, or an auto 230A, and then the customer data is further transmitted to the pPOS 240A. After the pPOS 240A has received the customer data and payment information, FIG. 2A shows that the entire payment transaction data is transmitted to a merchant acquirer 260A, via HTTPS/SSL (Hypertext Transfer Protocol Secure/Secure Sockets Layer) for a secure and encrypted communication link between the pPOS 240A and the merchant acquirer 260A web server over the internet. FIG. 2A further shows that the payment transaction data can be encrypted by point-to-point encryption (P2PE) or end-to-end encryption (E2EE). Therefore, the merchant acquirer receives an encrypted transaction of payment message with customer PCI data. The merchant acquirer can then decrypt the PAN/PCI data via P2PE/E2EE.

Meanwhile, at the same time, the pPOS 240A also creates a merchant transaction mirror, which is transmitted to the merchant at the merchant e-commerce website 250A. FIG.

2A shows that the merchant transaction mirror can include the following customer data: web session and shopping cart ID (identifier), Credit/debit card PAN—9999-9999-9999-0001 (which can be a dummy placeholder), CVC—1234* (which are optional values), EXP—31/12* (which are optional values), Name—@#$!@# (which is "data encoded"), and Address—$!@#4889134124 (which is "data encoded"). FIG. 2A shows that the merchant transaction mirror can still be transmitted to a merchant 250A, via HTTPS/SSL (Hypertext Transfer Protocol Secure/Secure Sockets Layer) for a secure and encrypted communication link between the pPOS 240A and the merchant e-commerce website 250A web server over the internet. But the merchant is receiving a mirror transaction of the payment and/or customer data in a message without any PCI data, so there is no longer any need to protect the mirror data via PCI requirements. This, in turn, will save the merchant from the cost and liability of protecting the mirror data at the merchant website, as well as the added cost of PCI implementation and audit.

Figure 2B:
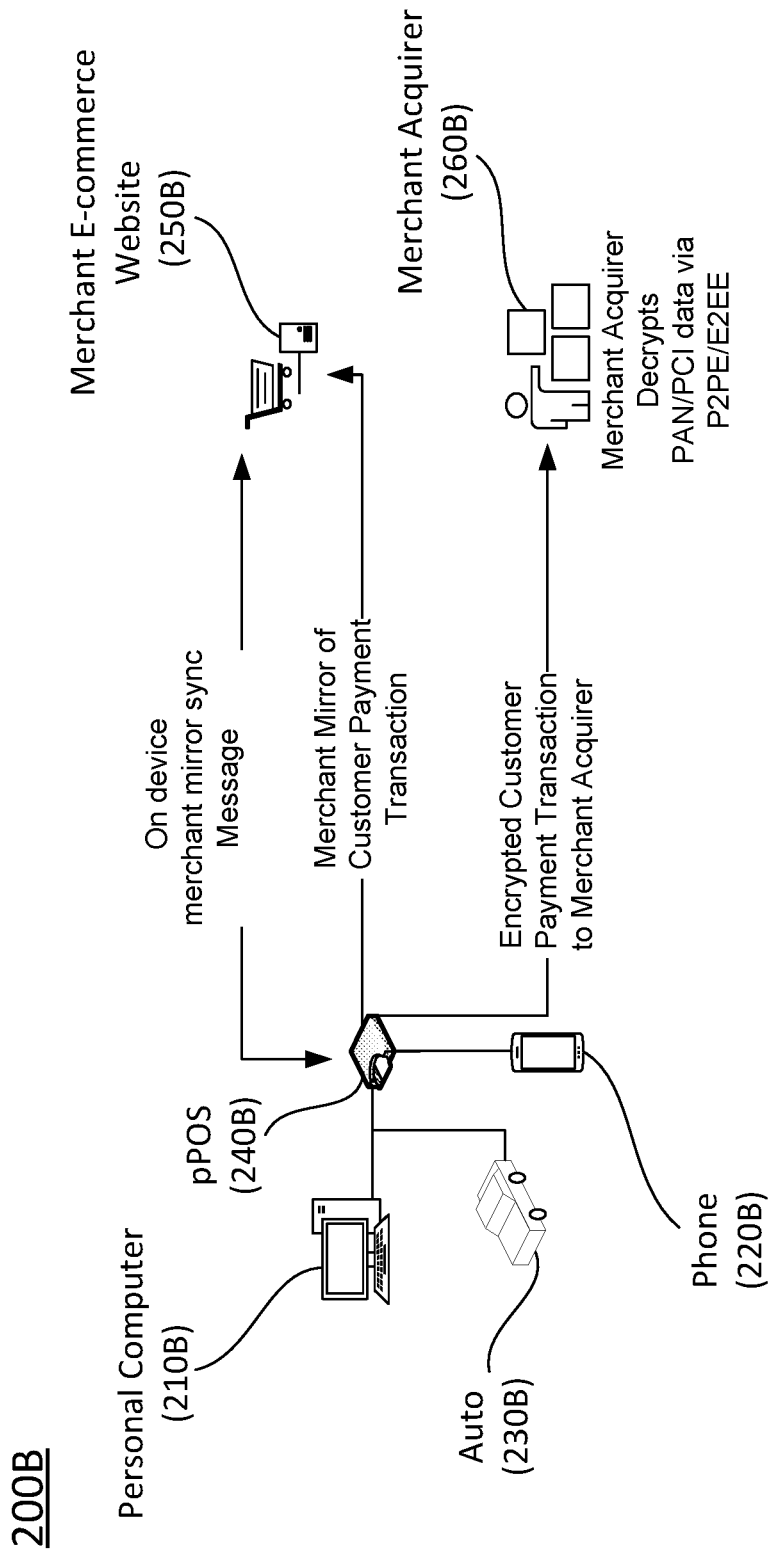
FIG. 2B shows e-commerce components and process flows for "card present" transactions performed with a personal Point of Sale (pPOS) device, together with Merchant Transaction Mirror and Merchant Transaction Mirror synchronization to the pPOS device, in accordance with some example embodiments.

Later, if the merchant wishes to synchronize the merchant transaction mirror with the pPOS device, an embodiment of such a synchronization process is shown in FIG. 2B. In particular, FIG. 2B shows e-commerce components and process flows for "card present" transactions performed with a personal Point of Sale (pPOS) device 240B, together with Merchant Transaction Mirror and Merchant Transaction Mirror synchronization to the pPOS device 240B, in accordance with some example embodiments.

As shown in FIG. 2B, pPOS 240B can receive customer payment transaction data from a personal computer 210B, a smart phone 220B, or an auto 230B. Or, in an embodiment, pPOS 240B can receive customer payment transaction data directly from the customer. After pPOS 240B has received the customer payment transaction data, FIG. 2B shows that pPOS 240B can encrypt the customer payment transaction data, and then transmit encrypted customer payment transaction data to a merchant acquirer 260B. Meanwhile, at the same time, FIG. 2B also shows that pPOS 240B can also create a merchant mirror of the customer payment transaction, and then transmitted the merchant mirror of the customer payment transaction to the merchant e-commerce website 250B. After these two above steps, FIG. 2B further shows that, in one embodiment of a synchronization process, merchant e-commerce website 250B can interact with pPOS device 240B for merchant transaction mirror synchronization to the pPOS device 240B, via on device merchant mirror synchronization message.

Figure 3:
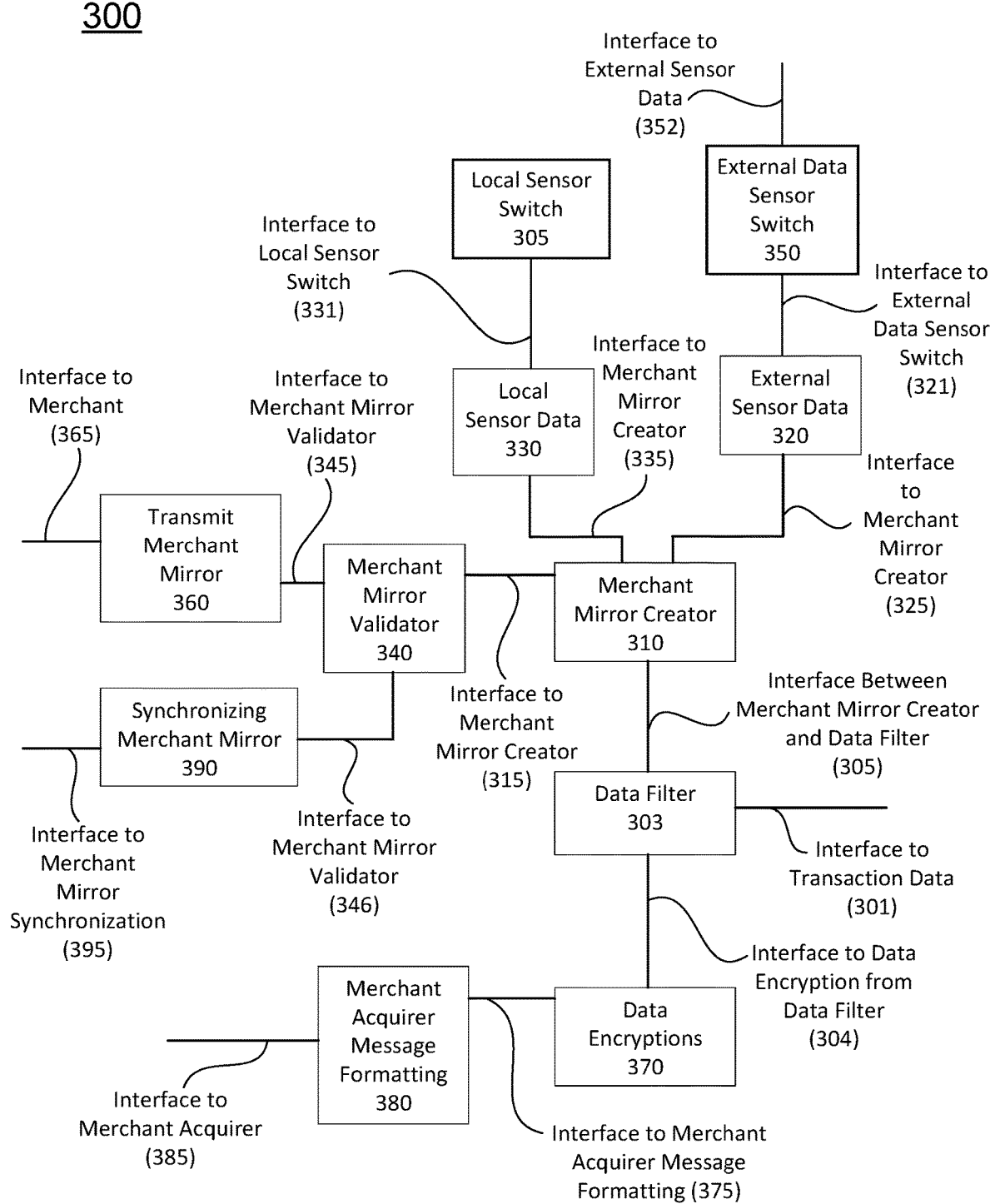
FIG. 3 shows a functional block diagram of a system for providing Merchant Transaction Mirror and Merchant Transaction Mirror synchronization, in accordance with some example embodiments.

FIG. 3 shows a functional block diagram of a system 300 for providing Merchant Transaction Mirror and Merchant Transaction Mirror synchronization, in accordance with some example embodiments. In some embodiments, system 300 can be a pPOS (personal point of sale) device.

FIG. 3 shows that system 300 is comprised of a data filter 303, a merchant mirror creator 310, and a merchant mirror validator 340. The data filter 303 receives transaction data from interface 301. The transaction data is comprised of payment and/or customer identification data elements in a transaction (such as a merchant payment transaction). The data filter 303 is configured to filtering the transaction data, wherein the filtering is comprised of identifying payment and/or customer identification data elements in a transaction. The merchant mirror creator 310 receives the payment and/or customer identification data elements from the data filter 303 via interface 305. The merchant mirror creator 310 is configured to creating a merchant mirror transaction from the payment and/or customer identification data elements, wherein creating is comprised of using data encoding functions. The merchant mirror validator 340 receives the merchant mirror transaction from the merchant mirror creator 310 via interface 315. The merchant mirror validator 340 is configured to validating the merchant mirror transaction, wherein validating is comprised of authenticating data elements in the merchant mirror transaction. The functional blocks (or components) of system 300 (such as a data filter 303, a merchant mirror creator 310, and a merchant mirror validator 340) can be implemented by software, hardware or a combination of hardware and software.

The data filter 303 can filter the transaction data, wherein the filtering is comprised of identifying payment and/or customer identification data elements in a transaction. In some embodiments, identifying the payment data elements can be comprised of: (1) using data pattern matching technique to determine the payment data elements, (2) using heuristic rules technique to determine the payment data elements, (3) using artificial intelligence neural net technique to determine the payment data elements. In some embodiments, the payment data elements can be comprised of one or more of the following: credit card number, credit card data, debit account number, debit account data, close loop stored value number, coupon encoded data element, voucher encoded data element, rebate encoded data element, digital currency data elements. In some embodiments, identifying the customer identification data elements can be comprised of: (1) using data pattern matching technique to determine the customer identification data elements, (2) using heuristic rules technique to determine the customer identification data elements, (3) using artificial intelligence neural net technique to determine the customer identification data elements. In some embodiments, the customer identification data elements can be comprised of one or more of the following: name, address, city, state, zip code, email, government or state or local ID (identification) number, driver license data elements, passport data elements.

The data filter 303 can filter the transaction data, wherein the filtering is comprised of identifying payment and/or customer identification data elements in a transaction. In some embodiments, identifying the payment data elements can be using data pattern matching technique to find (but not limited to) credit card numbers, debit account numbers, close loop stored value number, coupon encoded data elements, voucher encoded data elements, rebate encoded data elements, and/or digital currency data elements in a transaction. Credit account, debit account, coupon, rebates, and voucher have both a specific length, format and sequence of numbers. These sequences can be found by matching known patterns to data in the transaction. For example, credit/debit account number can start with BIN (bank identification number) and are 16 digits long. BIN (bank identification number) can be the initial four to six numbers that appear on a credit card. The bank identification number uniquely identifies the institution issuing the card. The BIN can be the key in the process of matching transactions to the issuer of the charge card. Coupon codes and promotion codes all have similar format, based on range of numbers/letters and sequence of number and letters. As another example, close loop stored value number, coupon encoded data elements, voucher encoded data elements, and rebate encoded data elements all do not have a BIN. As a further example, digital currency can be crypto currency and block chain data elements.

The data filter 303 can filter the transaction data, wherein the filtering is comprised of identifying payment and/or customer identification data elements in a transaction. In some embodiments, identifying the customer identification data elements can be comprising of: (1) using customer data pattern matching technique to find (but not limited to) name, address, city, state, zip, email, government/state/local ID numbers, in the transaction, (2) using customer pattern matching technique to find identification instruments for driver license and passport data elements in the transaction. For example, data elements of a driver license an include name, birth date, hair color, eye color, height, weight, address, date issued, expiration date, identification number, issuer identification number, jurisdiction version number, vehicle class, restriction codes, license ID, license data. As another example, data elements of a passport can include country of origin, signature, picture, data of birth, etc.

FIG. 3 shows that system 300 is further comprised of a local sensor switch 305 and an external data sensor switch 350. Local sensor switch 305 is configured to provide local sensor data 330 to merchant mirror creator 310 via interface 331 and interface 335. External data sensor switch 350 is configured to provide external sensor data 320 to merchant mirror creator 310 via interface 321 and interface 325. In some embodiments, the local sensor switch is configured to initiate and/or terminate a transaction. In some embodiments, the local sensor switch is further configured to collect user authentication data and notify a user of a device status. In some embodiments, the local sensor switch comprises a biometric sensor. The biometric sensor is used to collect user biometric data for enrollment and authentication of: the user of the device, and/or the transaction from the device to a merchant and/or a merchant acquirer. In some embodiments, the local sensor switch comprises a touch sensor. The touch sensor is used to collect user created data for enrollment and authentication of: the user of the device, and/or the transaction from the device to a merchant and/or a merchant acquirer. In some embodiments, a touch pattern and a sequence data can be managed by the user of the device using the touch sensor. In some embodiments, the local sensor switch is included in a pPOS device. In some embodiments, the local sensor switch is external to a pPOS device. In some embodiments, an external data sensor switch is configured to validate, manage, and/or create transactions. In some embodiments, an external data sensor switch is configured to process external data for a device. In some embodiments, a device allows an external data to access configuration and processing of the payment kernel by a merchant, a merchant acquirer, a payment issuer, and/or an identification issuer, wherein the external data is processed by the external data sensor switch. In some embodiments, an external data sensor switch provides one or more of the following functions: sensor data validation and filters, data identification by type and/or sensor and/or interface and/or communication protocol, data correlation between data types and sensors, data fusion between data, communication protocol, and data types.

The merchant mirror creator 310 can create a merchant mirror transaction from the payment and/or customer identification data elements, wherein creating is comprised of using data encoding functions. The data encoding functions can be comprised of one or more of the following: translating, mapping, masking, and randomizing the payment and/or customer identification data elements. In some embodiments, the data encoding functions is further comprised of using local and external sensor data to seed a data element initialization array and/or modeling function for each type of data element to be translated, mapped, masked, and randomized, wherein a local sensor switch transmits the local sensor data and an external data sensor switch transmits the external sensor data. In some embodiments, the data encoding functions is further comprised of encryption, wherein local and external sensor data is used to seed a random salt value for a specific encryption key for specific data element encryptions, wherein a local sensor switch transmits the local sensor data and an external data sensor switch transmits the external sensor data. In some embodiments, translating is comprised of using different terms for a data element. In some embodiments, mapping is comprised of establishing a one-to-one relationship between a data element with a value and/or a function. In some embodiments, masking is comprised of substituting part of a data element. In some embodiments, masking is comprised of covering up part of the data element or string (example: redacting). However, translating, mapping, masking, and randomizing are not encryption, because there are no keys involved.

In some embodiments, translating is comprised of using different terms for a data element. In some embodiments, translating is comprised of using local and external sensor data to seed the data element translation model between sensor types and data elements, For example, fingerprint value 1 equals index data element value 10. Here, fingerprint has 26 points that it can use to identify a fingerprint. Then this fingerprint value can be mapped to an index data element value that is between 0 and 100.

In some embodiments, masking is comprised of using local and external sensor data to seed the data element reference array and/or model for each type of data element to be masked. Then specific data element, digits, characters or sequences of digits, characters or data elements can be masked. For example, the sensor data provides a seed value 5 from a specific sensor (Note: a pPOS can know this rule). Then masking is done by specific data element, say a name like Jeffery. Masking would transform Jeffery to become "JeffXry", where the masking value is an entry into the data element position 5. As another example of masking, the sensor data provides a seed value of 30 (range is 0-1000) from a specific sensor data element. Then masking is done by translating and replacing a specific data element. We start with an account number 4111 3333 3333 3333. The seed value of 30 is an index value into a matrix representing a specific data element type, size and placement (for example: index value 30 represents a length of 4 starting at the 5th data element). Then, the masked account number becomes 4111 ! @#$ 3333 3333.

The merchant mirror validator 340 can validate the merchant mirror transaction, wherein validating is comprised of authenticating data elements in the merchant mirror transaction. In some embodiments, validating of a mirror means that system 300, which created the mirror, can return the mirror to the transaction's original state. In some embodiments, system 300 can be a pPOS device. Therefore, in some embodiments, the pPOS device, which created the mirror, can return the mirror to the transaction's original state. In some embodiments, the merchant mirror transaction is validated by performing one or more of the following: doing checksum check, doing CRC (cyclic redundancy check) check, doing MAC (message authentication code) check. For example, a MAC (message authentication code) is a cryptographic checksum on data that uses a session key to detect both accidental and intentional modifications of the data.

It is important to note that system 300 (which is a pPOS device in some embodiments) keeps the "rules" to create the mirror data, but not the mirror data itself. Furthermore, in some embodiments, the "rules" (to create the mirror data) are driven by the local sensor switch (i.e., generally customer related data) and the external data sensor switch (i.e., generally merchant related data).

FIG. 3 also shows that system 300 is further comprised of data encryptions 370, merchant acquirer message formatting 380, and transmit merchant mirror 360. Data encryptions 370 is configured to encrypted transaction data, which is transmitted to data encryptions 370 from data filter 303 via interface 304. Data encryptions 370 further transmits encrypted transaction data to merchant acquirer message formatting 380 via interface 375. Merchant acquirer message formatting 380 is configured to format the encrypted transaction data for transmission to the merchant acquirer via interface 385. In other words, system 300 is configured to formatting and transmitting encrypted transaction data to a merchant acquirer via interface 385, wherein encrypting is performed by data encryptions 370 and formatting is performed by merchant acquirer message formatting 380. Additionally, transmit merchant mirror 360 is configured to receive the merchant mirror transaction from merchant mirror validator 340 via interface 345. Transmit merchant mirror 360 is also further configured to transmitting the merchant mirror transaction to a merchant via interface 365.

FIG. 3, additionally, shows that system 300 is further comprised of synchronizing merchant mirror 390, which enables the Merchant Transaction Mirror synchronization process. In order to enable the synchronization process, synchronizing merchant mirror 390 is configured to receive the original transaction from merchant mirror validator 340 via interface 346. Additionally, synchronizing merchant mirror 390 is further configured to communicating with a merchant via interface 395, and, if needed, transmitting the original transaction to the merchant via interface 395.

Figure 4:
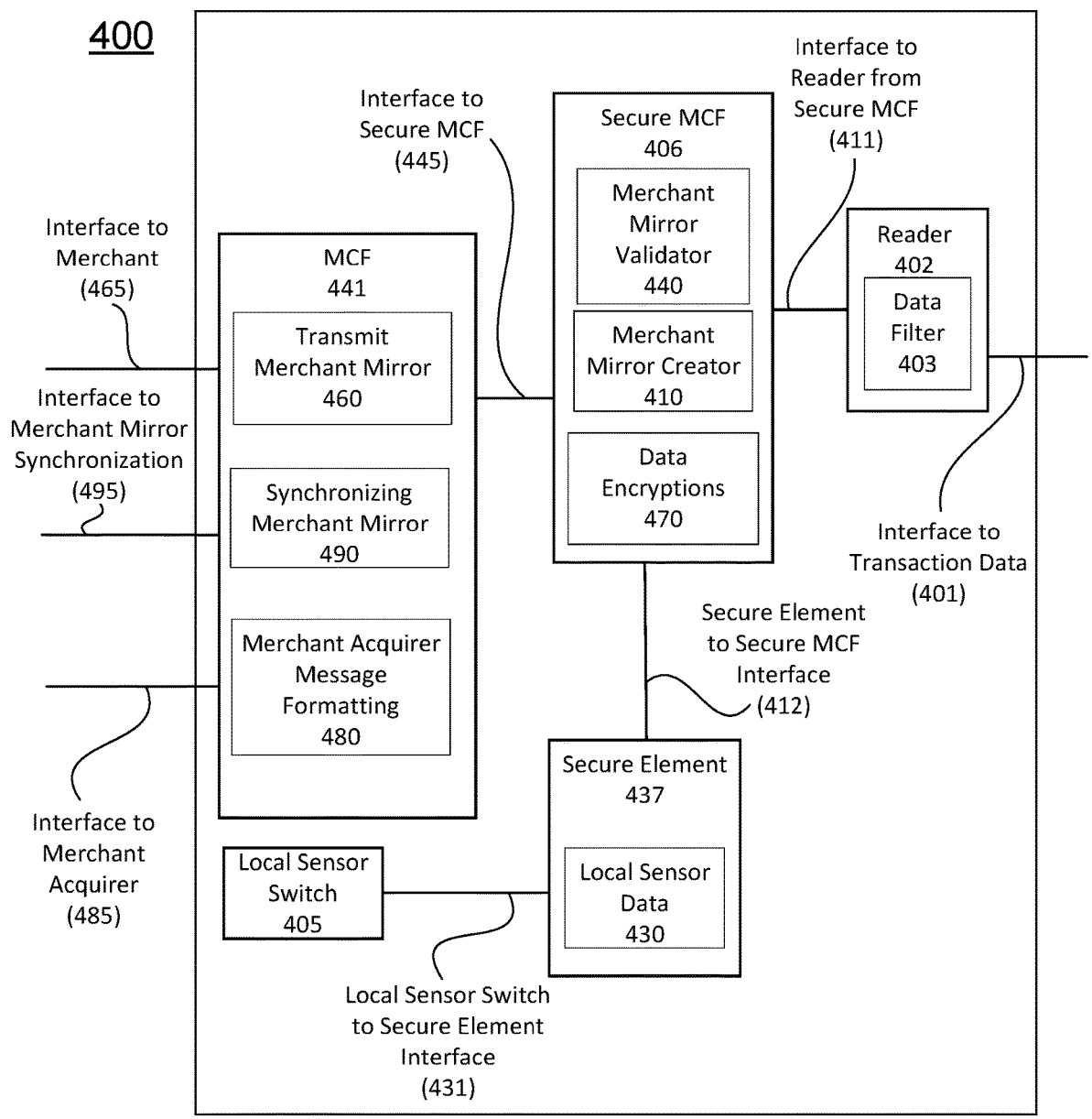
FIG. 4 shows a first personal Point of Sale (pPOS) device that is configured to provide Merchant Transaction Mirror and Merchant Transaction Mirror synchronization for "card present" e-commerce transactions and/or in vehicle merchant payments (where the Merchant Transaction Mirror is created in a secure MCF (microcontroller function)), in accordance with some example embodiments.

FIG. 4 shows a first personal Point of Sale (pPOS) device 400 that is configured to provide Merchant Transaction Mirror and Merchant Transaction Mirror synchronization for "card present" e-commerce transactions and/or in vehicle merchant payments (where the Merchant Transaction Mirror is created in a secure MCF (microcontroller function)), in accordance with some example embodiments. FIG. 4 shows that the pPOS device 400 includes a secure microcontroller function (MCF) 406, a secure element 437, a second MCF 441, a reader 402, and a local sensor switch 405. FIG. 4 also shows that the pPOS device 400 includes these interfaces: an interface 401 to transaction data, an interface 411 to reader from secure MCF, an interface 412 from secure element to secure MCF, an interface 431 from local sensor switch to secure element, an interface 445 to secure MCF from second MCF 441, an interface 465 to merchant, an interface 495 to merchant mirror synchronization, and an interface 485 to merchant acquirer.

In FIG. 4, the secure MCF 406 can be configured to creating a merchant mirror transaction from the payment and/or customer identification data elements, to validating the merchant mirror transaction, and to encrypting transaction data to a merchant acquirer. The secure MCF 406 can be further configured to provide application and data level encryption and hardware/software tamper detection. The secure MCF 406 can also include a payment kernel (not shown in FIG. 4), and the payment kernel can be configured to process payment.

In FIG. 4, the reader 402 can be configured to read a payment and/or identity instrument. The reader 402 can be further configured to filtering transaction data, wherein filtering is comprised of identifying payment and/or customer identification data elements in a transaction. In some embodiments, the reader 402 can be a certified EMV level 1 contact and/or contactless reader, where EMV stands for Europay, MasterCard, and Visa.

In FIG. 4, the secure element 437 can be configured to store and process payment and identification application. In some embodiments, the secure element 437 can be configured to execute a secure element application that is used for payment and authentication. In some embodiments, the secure element application can perform authentication using a multi-factor authentication method. In some embodiments, the secure element application can perform authentication using a multi-factor authentication method via PKI (public key infrastructure) and FIDO (Fast IDentity Online). In some embodiments, the secure element 437 can be further configured to execute a second secure element application that is used for customer biometric storage and validation.

FIG. 4 also shows a local sensor switch 405. The local sensor switch 405 can be configured to initiate and/or terminate a transaction. The local sensor switch 405 also can transmit local sensor data 430 to the secure element 437. In some embodiments, the local sensor switch 405 can be further configured to collect user authentication data. In some embodiments, the local sensor switch 405 can be further configured to collect user authentication data and notify a user of a device status.

In some embodiments, the local sensor switch 405 includes a biometric sensor. In some embodiments, the biometric sensor is used to collect user biometric data for enrollment and authentication of the user of the device, and/or the transaction from the device to a merchant and/or a merchant acquirer. In some embodiments, the biometric data is managed by the user of the device. In some embodiments, the biometric data can be one or more of the following: a face of the user, a finger of the user, a fingerprint of the user, an iris of the user, a voice of the user, a heart rhythm of the user, a physical attribute of the user, and any other biometric identifier of the user.

In some embodiments, the local sensor switch 405 includes a touch sensor. In some embodiments, the touch sensor is used to collect user created data for enrollment and authentication of the user of the device, and/or the transaction from the device to a merchant and/or a merchant acquirer. In some embodiments, a touch pattern and a sequence data can be managed by the user of the device using the touch sensor.

In FIG. 4, the pPOS device 400 also includes a second MCF 441. The second MCF 441 is configured to formatting and transmitting encrypted transaction data to a merchant acquirer. In some embodiments, the secure MCF 406 and/or the second MCF 441 is configured to formatting and transmitting encrypted transaction data to a merchant acquirer. The second MCF 441 is further configured to transmitting the merchant mirror transaction to a merchant. In some embodiments, the secure MCF 406 and/or the second MCF 441 is further configured to transmitting the merchant mirror transaction to a merchant.

In some embodiments, the secure MCF 406 and/or a second MCF 441 can be configured to perform I/O (input/output) functions. In some embodiments, the secure MCF 406 and/or the second MCF 441 can be configured to perform I/O (input/output) functions with a certified EMV level 3 (L3) payment application, where EMV stands for Europay, MasterCard, and Visa.

Figure 5:
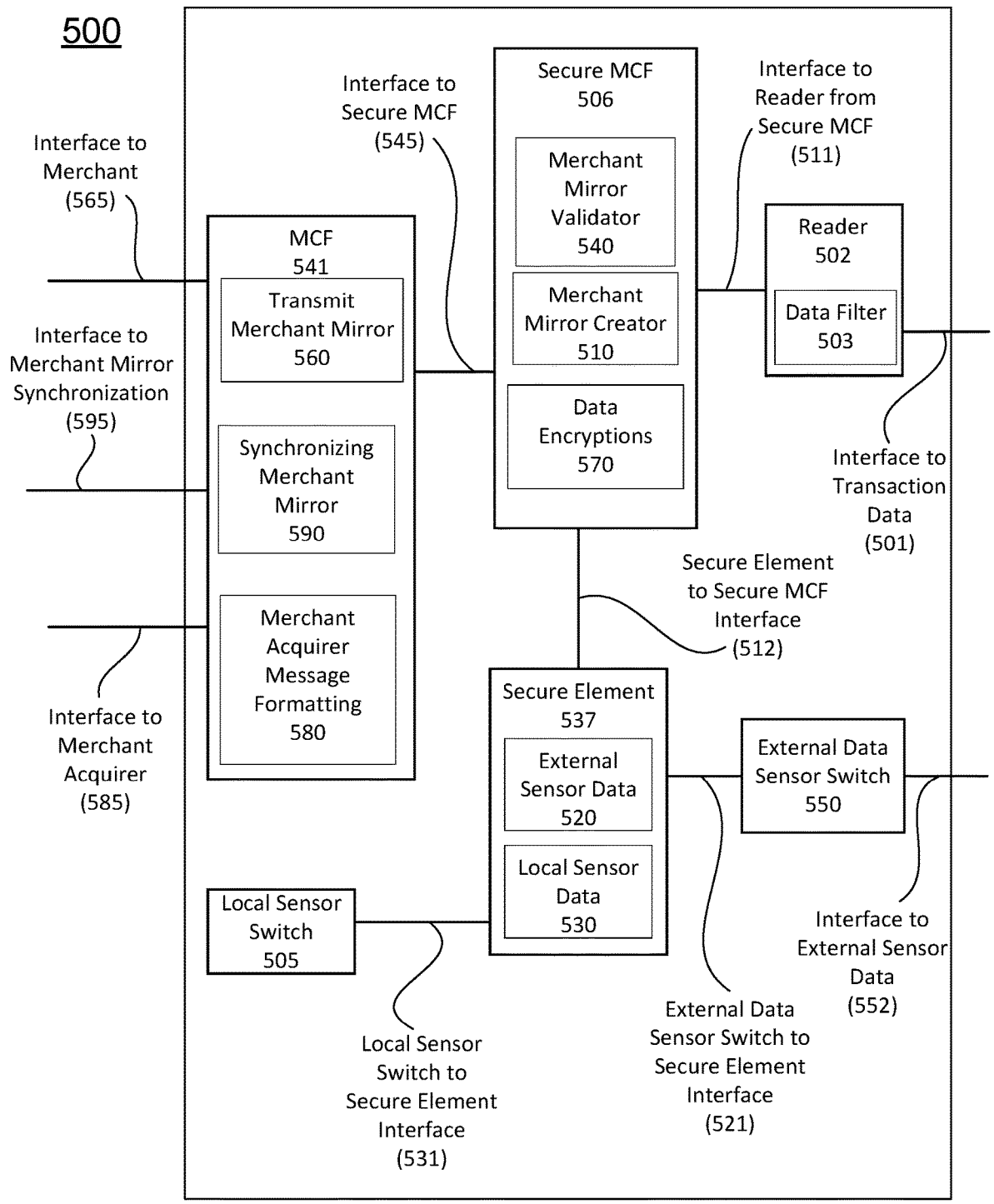
FIG. 5 shows a second personal Point of Sale (pPOS) device that is configured to provide Merchant Transaction Mirror and Merchant Transaction Mirror synchronization for "card present" e-commerce transactions and/or in vehicle merchant payments (where the Merchant Transaction Mirror is created in a secure MCF (microcontroller function) and external sensor data is provided by an external data sensor switch), in accordance with some example embodiments.

FIG. 5 shows a second personal Point of Sale (pPOS) device 500 that is configured to provide Merchant Transaction Mirror and Merchant Transaction Mirror synchronization for "card present" e-commerce transactions and/or in vehicle merchant payments (where the Merchant Transaction Mirror is created in a secure MCF (microcontroller function) and external sensor data is provided by an external data sensor switch), in accordance with some example embodiments. The pPOS device 500 of FIG. 5 is similar to the pPOS device 400 of FIG. 4, except pPOS device 500 also has an external data sensor switch 550, which provides external sensor data 520.

In particular, FIG. 5 shows that the pPOS device 500 includes a secure microcontroller function (MCF) 506, a secure element 537, a second MCF 541, a reader 502, a local sensor switch 505, and an external data sensor switch 550. FIG. 5 also shows that the pPOS device 500 includes these interfaces: an interface 501 to transaction data, an interface 511 to reader from secure MCF, an interface 512 from secure element to secure MCF, an interface 531 from local sensor switch to secure element, an interface 552 to external sensor data from external data sensor switch, an interface 521 from external data sensor switch to secure element, an interface 545 to secure MCF 506 from second MCF 541, an interface 565 to merchant, an interface 595 to merchant mirror synchronization, and an interface 585 to merchant acquirer.

All of the FIG. 5 functional components (such as the secure microcontroller function (MCF) 506, the secure element 537, the second MCF 541, the reader 502, and the local sensor switch 505) behave and are configured in a manner similar to their counterpart functional components in FIG. 4.

Additionally, FIG. 5 also shows an external data sensor switch 550. The external data sensor switch 550 can transmit external sensor data 520 to the secure element 537.

In some embodiments, the external data sensor switch is configured to process external data for the device. In some embodiments, the external data sensor switch is configured to validate, manage, and/or create transactions. In some embodiments, the external data sensor switch allows external data to access configuration and processing of the payment kernel by a merchant, a merchant acquirer, a payment issuer, and/or an identification issuer. In some embodiments, the external data sensor switch allows external data to access configuration and processing of the payment kernel by a merchant, a merchant acquirer, a payment issuer, and/or an identification issuer, wherein the external data is processed by the external data sensor switch. In some embodiments, the external data sensor switch provides one or more of the following functions: (1) sensor data validation and filters, (2) data identification by type and/or sensor and/or interface and/or communication protocol, (3) data correlation between data types and sensors, (4) data fusion between data, communication protocol, and data types.

In some embodiments, the pPOS device 500 can use external data elements and sources to authenticate the merchant to the pPOS device 500 in a customer's vehicle. The external data includes the physical address of the merchant, geolocation data, cell tower phone data, local merchant Bluetooth and Wi-Fi data from beacons or hotspots.

In some embodiments, the external data can include sensor data, such as cellular signal, WiFi (wireless local area network) signal, UHF (ultra high frequency) signal, beacon signal, V2X (vehicle-to-infrastructure and/or vehicle-to-vehicle) radar signal, image data. In some embodiments, the external data can include sensor data which is comprised of one of the following: geolocation data, Bluetooth or Bluetooth low energy directional and signal power, WiFi (wireless local area network) signal, GSM (Global System for Mobile Communications) signal, NFMI (near field magnetic induction) signal, image data, radar data, V2X (vehicle-to-infrastructure and/or vehicle-to-vehicle) radar signal.

In some embodiments, the external data types are RF (radio frequency) signals comprised of one or more of the following: WiFi (wireless local area network) signal, Bluetooth or Bluetooth low energy signal, GSM (Global System for Mobile Communications) signal, NFMI (near field magnetic induction) signal, V2X (vehicle-to-infrastructure and/or vehicle-to-vehicle) radar signal, UHF (ultra high frequency) signal, HF (high frequency) signal, LF (low frequency) signal. In some embodiments, the external data types are image data comprised of one or more of the following: images and/or videos from side, front, or rear cameras on the vehicle, images and/or videos from side, front, or rear cameras from a second vehicle.

With regards to sensor data validation and filters, in some embodiments, sensor data filter is the process or ability of removing data errors like measurement errors, inconsistent data, and/or duplicate data form a sensor. An example would be getting WiFi data from a merchant and some of data is missing data elements. Filter would remove/delete that data.

With regards to data correlation between data types and sensors, in some embodiments, sensor data correlation is the ability to understand the data gathered as it applies to other data in the appropriate context. Data correlation is the ability to pull data from various sources and derive benefit from the understanding of the relationship between them to determine a more informed way forward. An example would be combining WiFi merchant data with geolocation user cell data as a way to determine that a user is at the merchant location.

With regards to data fusion between data, communication protocol, and data types, in some embodiments, sensor data fusion is the process of integrating multiple data sources to produce more consistent, accurate, and useful information than that provided by any individual data source. An example for this would be creating a new event/transaction from WiFi merchant data with geolocation user cell data and a pPOS device for a user to make a payment.

In some embodiments, the data correlation and fusion are comprised of one or more of the following functions: sensor data collection and validation of data events, correlation of sensor data events with image processing data, and/or geolocation data, and/or transactional history, fusion of sensor data events with image processing data, and/or geolocation data, and/or transactional history.

Figure 6:
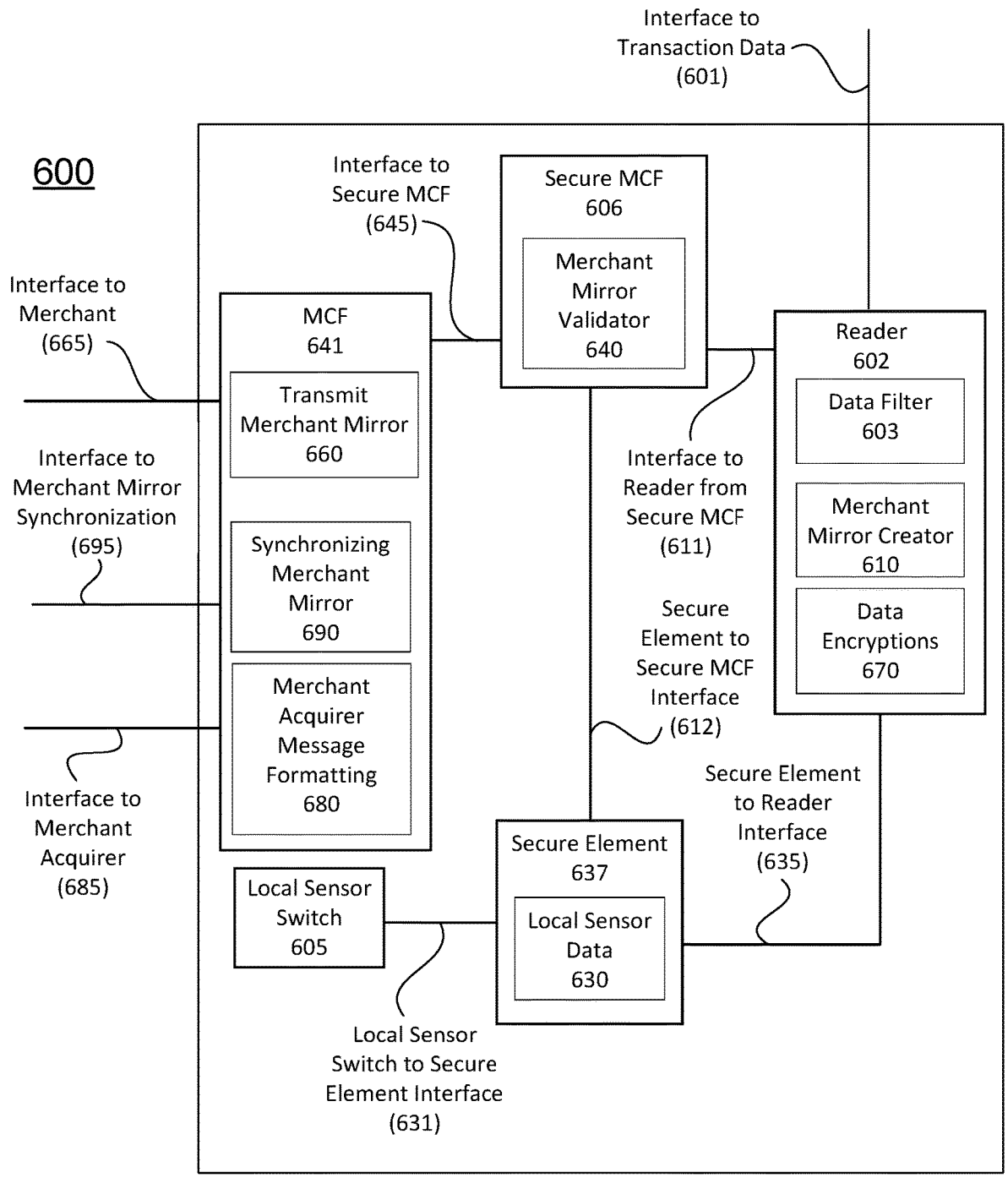
FIG. 6 shows a third personal Point of Sale (pPOS) device that is configured to provide Merchant Transaction Mirror and Merchant Transaction Mirror synchronization for "card present" e-commerce transactions and/or in vehicle merchant payments (where the Merchant Transaction Mirror is created in a reader), in accordance with some example embodiments.

FIG. 6 shows a third personal Point of Sale (pPOS) device 600 that is configured to provide Merchant Transaction Mirror and Merchant Transaction Mirror synchronization for "card present" e-commerce transactions and/or in vehicle merchant payments (where the Merchant Transaction Mirror is created in a reader), in accordance with some example embodiments. The pPOS device 600 of FIG. 6 is similar to the pPOS device 400 of FIG. 4, except the merchant mirror creator 610 and data encryption 670 function blocks (or components) have been "shifted" from the secure MCF to the reader.

In particular, FIG. 6 shows that the pPOS device 600 includes a secure microcontroller function (MCF) 606, a secure element 637, a second MCF 641, a reader 602, and a local sensor switch 605. FIG. 6 also shows that the pPOS device 600 includes these interfaces: an interface 601 to transaction data, an interface 611 to reader from secure MCF, an interface 612 from secure element to secure MCF, an interface 631 from local sensor switch to secure element, an interface 635 from secure element to reader, an interface 645 to secure MCF 606 from second MCF 641, an interface 665 to merchant, an interface 695 to merchant mirror synchronization, and an interface 685 to merchant acquirer.

All of the FIG. 6 functional components (such as the secure microcontroller function (MCF) 606, the secure element 637, the second MCF 641, the reader 602, and the local sensor switch 605) behave and are configured in a manner similar to their counterpart functional components in FIG. 4, except for the secure microcontroller function (MCF) 606 and the reader 602.

In FIG. 6, the functions of merchant mirror creation 610 and data encryptions 670 have been added to reader 602. Therefore, the reader 602 can be configured to creating a merchant mirror transaction from the payment and/or customer identification data elements, to validating the merchant mirror transaction, and to read a payment and/or identity instrument. The reader 602 can also be configured to filtering transaction data, wherein filtering is comprised of identifying payment and/or customer identification data elements in a transaction. In some embodiments, the reader 602 can be a certified EMV level 1 contact and/or contactless reader, where EMV stands for Europay, MasterCard, and Visa.

In FIG. 6, the functions of merchant mirror creation 610 and data encryptions 670 have been removed from the secure MCF 606. Therefore, the secure MCF 606 is configured to validating the merchant mirror transaction. However, the secure MCF 406 can still be further configured to provide application and data level encryption and hardware/software tamper detection. The secure MCF 606 can also include a payment kernel (not shown in FIG. 6), and the payment kernel can be configured to process payment.

Figure 7:
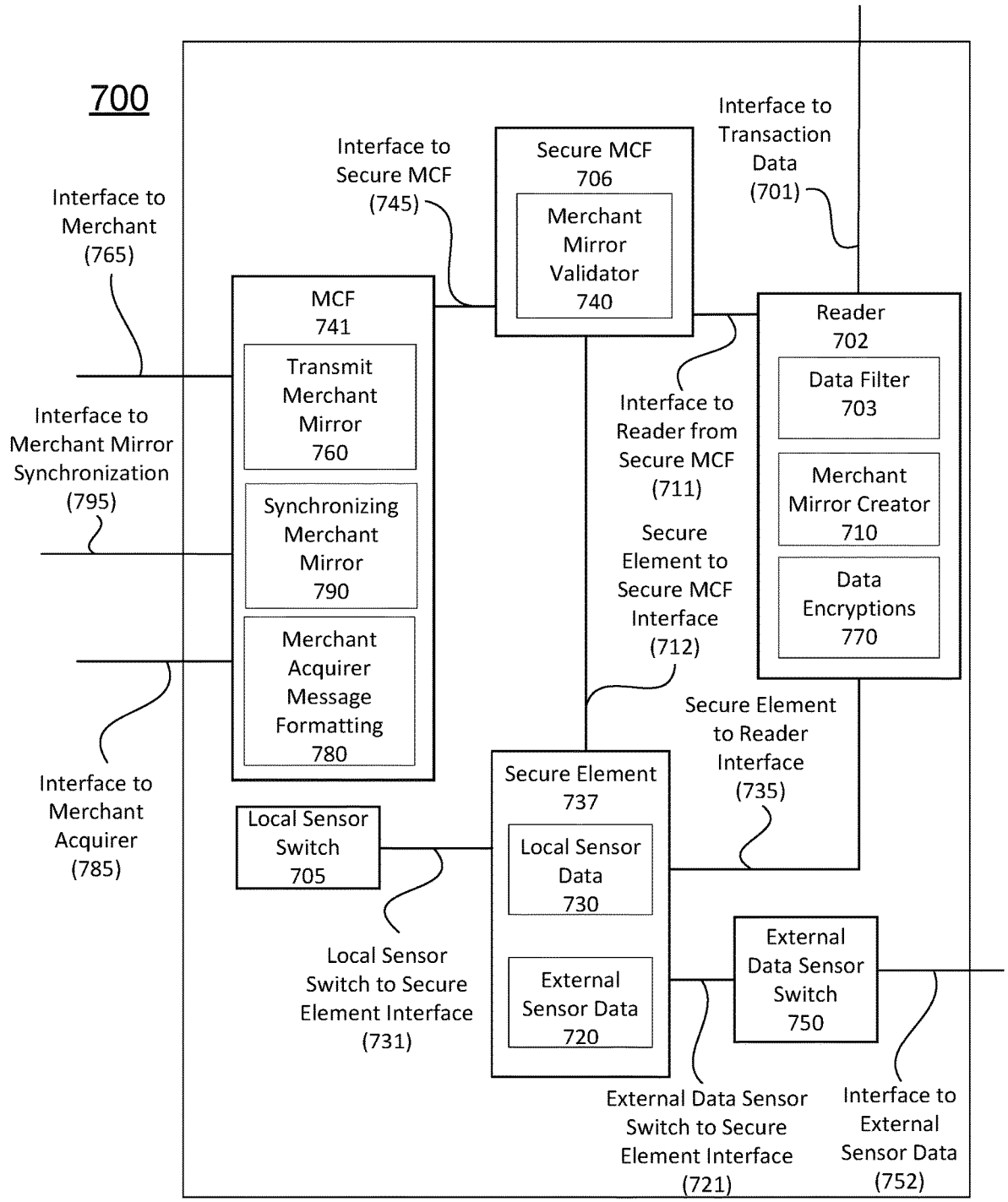
FIG. 7 shows a fourth personal Point of Sale (pPOS) device that is configured to provide Merchant Transaction Mirror and Merchant Transaction Mirror synchronization for "card present" e-commerce transactions and/or in vehicle merchant payments (where the Merchant Transaction Mirror is created in a reader and external sensor data is provided by an external data sensor switch), in accordance with some example embodiments.

FIG. 7 shows a fourth personal Point of Sale (pPOS) device 700 that is configured to provide Merchant Transaction Mirror and Merchant Transaction Mirror synchronization for "card present" e-commerce transactions and/or in vehicle merchant payments (where the Merchant Transaction Mirror is created in a reader and external sensor data is provided by an external data sensor switch), in accordance with some example embodiments. The pPOS device 700 of FIG. 7 is similar to the pPOS device 600 of FIG. 6, except pPOS device 700 also has an external data sensor switch 750, which provides external sensor data 720.

In particular, FIG. 7 shows that the pPOS device 700 includes a secure microcontroller function (MCF) 706, a secure element 737, a second MCF 741, a reader 702, a local sensor switch 705, and an external data sensor switch 750. FIG. 7 also shows that the pPOS device 700 includes these interfaces: an interface 701 to transaction data, an interface 711 to reader from secure MCF, an interface 712 from secure element to secure MCF, an interface 731 from local sensor switch to secure element, an interface 752 to external sensor data from external data sensor switch, an interface 721 from external data sensor switch to secure element, an interface 745 to secure MCF 706 from second MCF 741, an interface 765 to merchant, an interface 795 to merchant mirror synchronization, and an interface 785 to merchant acquirer.

All of the FIG. 7 functional components (such as the secure microcontroller function (MCF) 706, the secure element 737, the second MCF 741, the reader 702, and the local sensor switch 705) behave and are configured in a manner similar to their counterpart functional components in FIG. 6.

Additionally, FIG. 7 also shows an external data sensor switch 750. The external data sensor switch 750 can transmit external sensor data 720 to the secure element 737.

Figure 8:
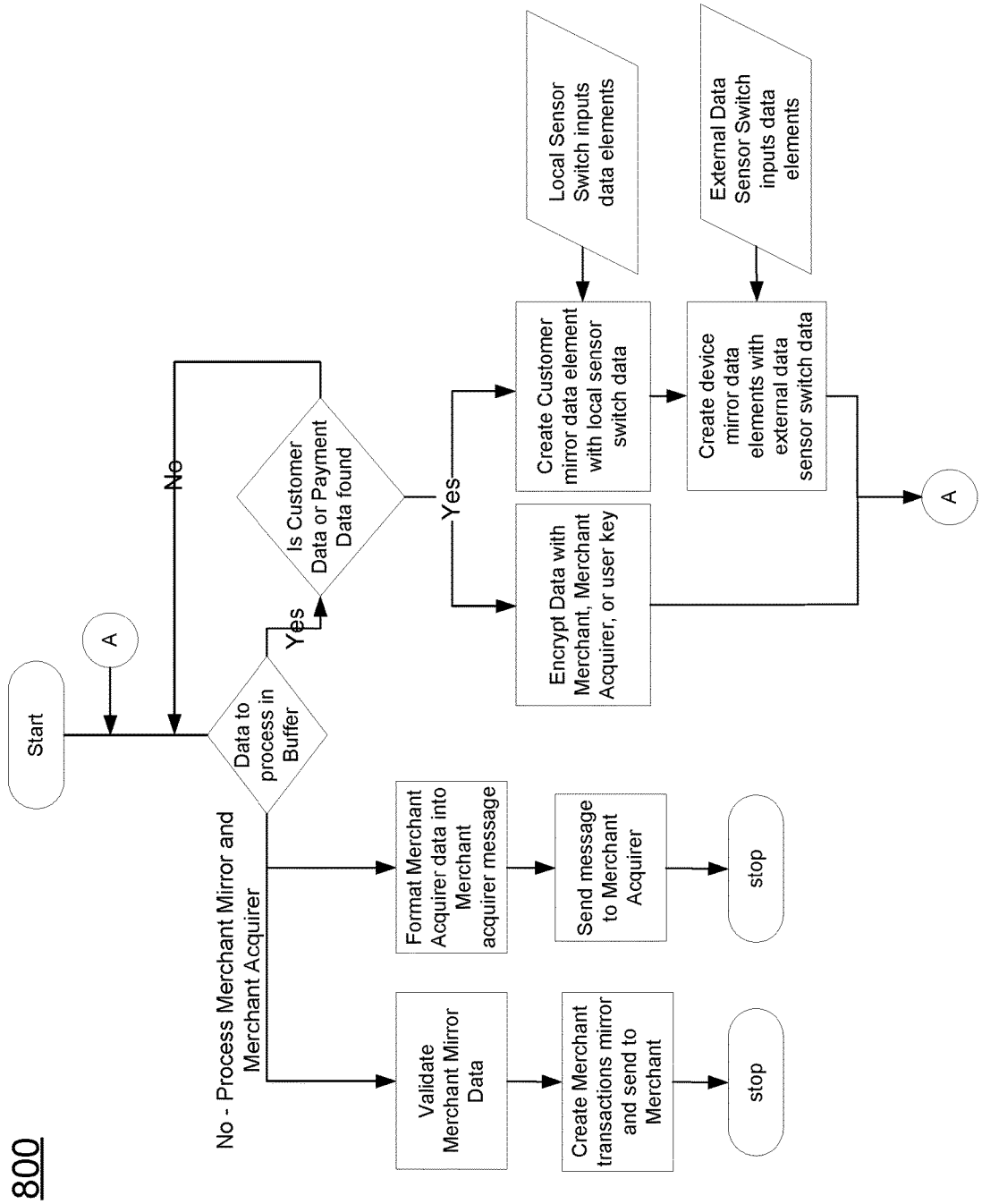
FIG. 8 shows a process flow for "card present" transactions performed with a personal Point of Sale (pPOS) device, together with Merchant Transaction Mirror, in accordance with some example embodiments.

FIG. 8 shows a process flow 800 for "card present" transactions performed with a personal Point of Sale (pPOS) device, together with Merchant Transaction Mirror, in accordance with some example embodiments.

In the FIG. 8 process flow 800, the flow begins by checking if there is data waiting to be process in the buffer. If the answer is yes (i.e., there is data waiting to be process in the buffer), then process flow 800 checks if there is customer data or payment data found. If no, then the process flow returns to checking if there is data waiting to be process in the buffer. If yes, then the process flow continues to creating customer mirror data element with local sensor switch data, wherein the local sensor switch inputs data elements. Next, the process flow continues to creating device mirror data element with external data sensor switch data, wherein the external data sensor switch inputs data elements. Process flow 800 also works in parallel, encrypting data with merchant, merchant acquirer, or user (i.e., customer) key. After the mirror data is created and the customer/payment data encrypted, process flow 800 returns via point A to the beginning, and then again checking if there is data waiting to be processed in the buffer. Now, if the answer is yes and there is still data waiting to be process in the buffer, then process flow 800 continues the above steps. If, however, the answer is no and there is no more data waiting to be processed in the buffer, then process flow 800 continues to the steps on the left of FIG. 8. Here, there are two parallel series of processing steps. In the first series of processing steps, the encrypted merchant acquirer data is formatted into merchant acquirer message. Then process flow 800 send the formatted message to the merchant acquirer. In the second series of processing steps, process flow 800 validates the merchant mirror data. Next, process flow 800 creates the merchant transaction mirror, and then sends the merchant transaction mirror to the merchant.

Figure 9:
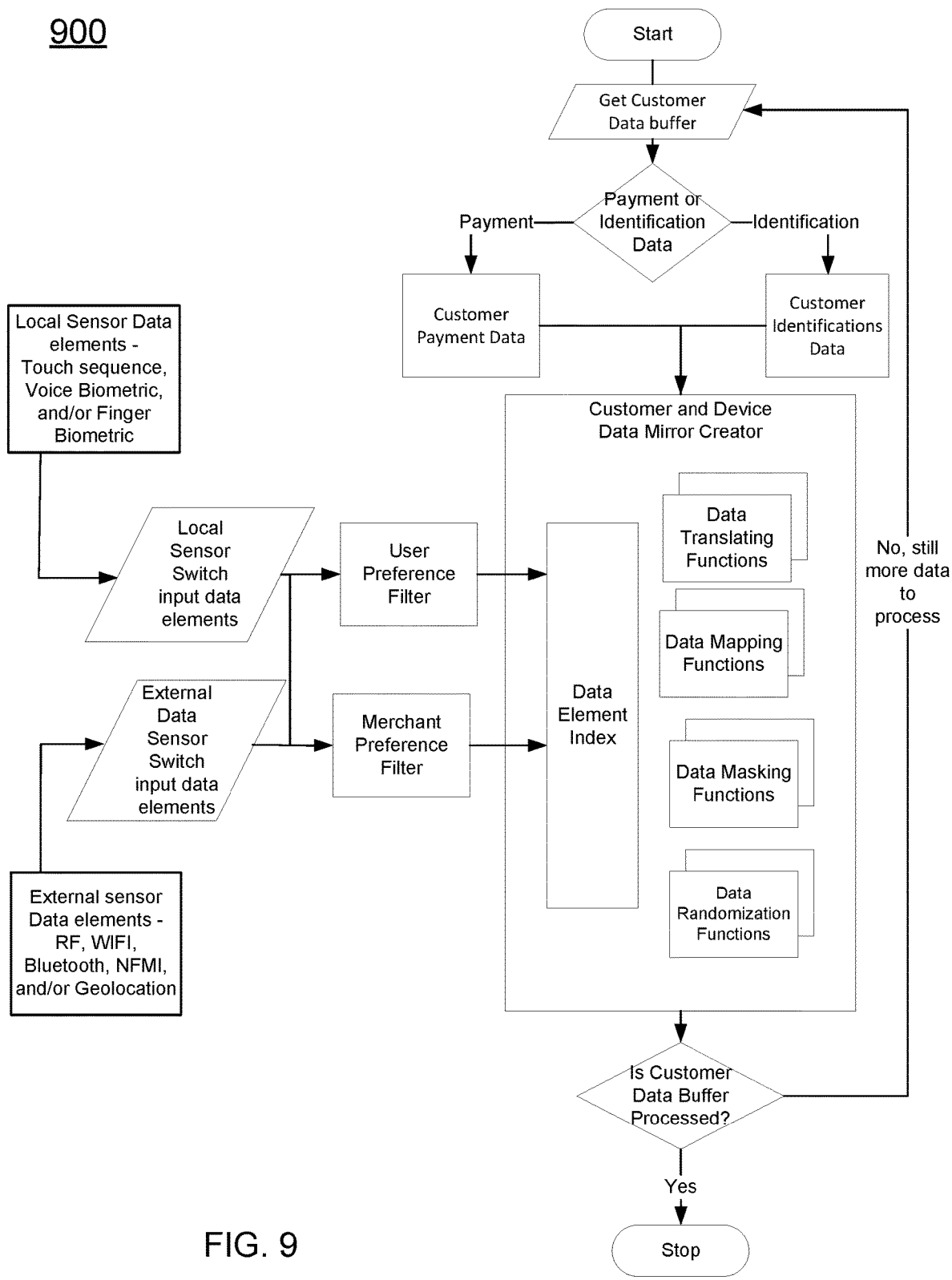
FIG. 9 shows a detailed view of the "Merchant Transaction Mirror" creation process (which is a part of the FIG. 8 process flow), in accordance with some example embodiments.

FIG. 9 shows a detailed view of the "Merchant Transaction Mirror" creation process (which is a part of the FIG. 8 process flow), in accordance with some example embodiments. In particular, FIG. 9 is a detailed view of the right side of the FIG. 8 process flow (i.e., where the mirror data is being created with local sensor switch data and external data sensor switch data). FIG. 9 shows a process flow 900, that begins from the FIG. 8 step of "yes, there is data waiting to be process in the buffer".

In FIG. 9, process flow 900 begins by getting the customer data buffer, after checking and finding that there is data waiting to be process in the buffer (step from FIG. 8, which is not shown in FIG. 9). Process flow 900 assumes that payment or identification data have been found. Process flow 900 shows that there are two types of data: (1) customer payment data, which is associated with payment, (2) customer identification data, which is associated with identification. Then the customer and device data mirror is created. Here, creating a data mirror from the payment and/or customer identification data elements is comprised of using one or more of the following four data encoding functions: data translating, data mapping, data masking, and data randomization. Process flow 900 shows that the data encoding functions is further comprised of using local and external sensor data to seed a data element initialization array and/or modeling function (e.g., data element index, plus user preference filter and merchant preference filter) for each type of data element to be translated, mapped, masked, and randomized, wherein a local sensor switch transmits the local sensor data and an external data sensor switch transmits the external sensor data. Process flow 900 shows that a local sensor switch inputs the local sensor data, which can include data elements such as touch sequence, voice biometric, finger biometric, etc. Process flow 900 also shows that an external data sensor switch inputs the external sensor data, which can include data elements such as RF (radio frequency), WiFi (wireless local area network), Bluetooth, NFMI (near field magnetic induction), geolocation, etc. Process flow 900 shows that the local and external sensor data are used to seed a data element index based on a user preference filter and a merchant preference filter. This data element index is then used for each type of data element to be translated, mapped, masked, and randomized. Finally, after the mirror data have been created, process 900 checks if the customer data buffer is processed. If the answer is no and there are still more data to be processed, then process flow 900 returns to the beginning step of "get customer data buffer" to create more mirror data. If, however, the answer is yes and there are no more data to be processed, then process flow 900 ends. (Note: After process flow 900 ends, the process continues to the steps on the left of FIG. 8, where the answer to the question ("Data to process in buffer?") is no because there is no more data waiting to be process in the buffer.)

Figure 10:
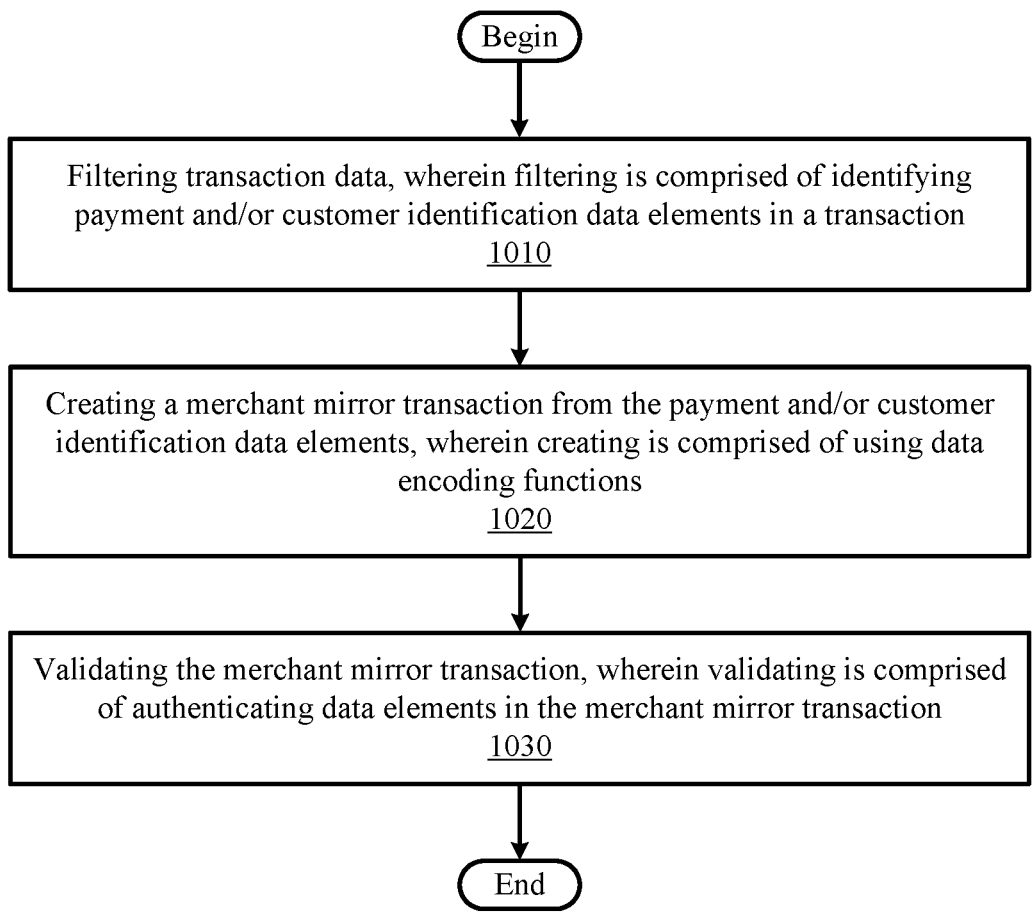
FIG. 10 shows a flow chart of method steps for providing transaction mirroring of a merchant transaction using a personal point of sale (pPOS), in accordance with some example embodiments.

FIG. 10 shows a flow chart of method steps for providing transaction mirroring of a merchant transaction using a personal point of sale (pPOS), in accordance with some example embodiments. As shown in FIG. 10, the method 1000 begins at step 1010, where the method filters transaction data, wherein filtering is comprised of identifying payment and/or customer identification data elements in a transaction. Then, the method proceeds to step 1020. In step 1020, the method creates a merchant mirror transaction from the payment and/or customer identification data elements, wherein creating is comprised of using data encoding functions. Next, at step 1030, the method validates the merchant mirror transaction, wherein validating is comprised of authenticating data elements in the merchant mirror transaction.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for providing transaction mirroring of a merchant transaction using a personal point of sale (pPOS) device which includes a microcontroller or computer, the method comprising:
receiving, at the pPOS device, electronic payment data elements and/or customer identification data elements from a customer;
filtering transaction data, wherein filtering includes identifying the payment data elements and/or customer identification data elements in a merchant transaction;
the pPOS device creating a merchant mirror transaction from the payment and/or customer identification data elements, wherein said creating includes using data encoding functions to encode, as part of the merchant mirror transaction, at least some of the customer identification data elements;
the pPOS device validating the merchant mirror transaction, wherein validating includes authenticating data elements in the merchant mirror transaction;
the pPOS device formatting and transmitting encrypted transaction data, including payment data used to pay for the merchant transaction, to a merchant acquirer; and
the pPOS device transmitting the merchant mirror transaction to a merchant in a separate communication from said transmitting the encrypted transaction data, wherein the merchant mirror transaction is a set of data that includes shopping cart identification data or other data which is to identify the merchant transaction and that does not include information to identify the payment data used to pay for the merchant transaction.

2. The method of claim 1, wherein the data encoding functions includes one or more of the following: translating, mapping, masking, and randomizing the payment and/or customer identification data elements.

3. The method of claim 2, wherein the data encoding functions further includes using local and external sensor data to seed a data element initialization array and/or modeling function for each type of data element to be translated, mapped, masked, and randomized, wherein a local sensor switch transmits the local sensor data and an external data sensor switch transmits the external sensor data.

4. The method of claim 2, wherein the data encoding functions further includes encryption, wherein local and external sensor data is used to seed a random salt value for a specific encryption key for specific data element encryptions, wherein a local sensor switch transmits the local sensor data and an external data sensor switch transmits the external sensor data.

5. The method of claim 2, wherein translating includes using different terms for a data element.

6. The method of claim 2, wherein mapping includes establishing a one-to-one relationship between a data element with a value and/or a function.

7. The method of claim 2, wherein masking includes substituting part of a data element.

8. The method of claim 1, wherein identifying the payment data elements includes:
using data pattern matching technique to determine the payment data elements, using heuristic rules technique to determine the payment data elements, using artificial intelligence neural net technique to determine the payment data elements.

9. The method of claim 8, wherein the payment data elements include one or more of the following:
credit card number,
credit card data,
debit account number,
debit account data,
close loop stored value number,
coupon encoded data element,
voucher encoded data element,
rebate encoded data element,
digital currency data elements.

10. The method of claim 1, where identifying the customer identification data elements includes:
using data pattern matching technique to determine the customer identification data elements,
using heuristic rules technique to determine the customer identification data elements,
using artificial intelligence neural net technique to determine the customer identification data elements.

11. The method of claim 10, where the customer identification data elements include one or more of the following:
name,
address,
city,
state,
zip code,
email,
government or state or local ID (identification) number,
driver license data elements,
passport data elements.

12. The method of claim 1, further including:
synchronizing merchant mirror transaction data elements and the merchant mirror transaction to the original merchant transaction.

13. A computer program product comprising executable instructions encoded in a non-transitory computer readable medium which, when executed by a system, carry out or control the method of claim 1.

14. The method of claim 1, wherein the step of the pPOS device formatting and transmitting encrypted transaction data to the merchant acquirer includes:
encrypting the merchant transaction data at the pPOS device;
formatting the encrypted merchant transaction data at the pPOS device; and
transmitting the formatted encrypted merchant transaction data from the pPOS device to the merchant acquirer via an interface that is separate from an interface via which the merchant mirror transaction is communicated from the pPOS device to the merchant.

* * * * *